United States Patent
Renz

(10) Patent No.: US 12,440,423 B2
(45) Date of Patent: *Oct. 14, 2025

(54) VENT VALVE ASSEMBLIES FOR BABY BOTTLES

(71) Applicant: JMBH Holdings, LLC, Shelton, CT (US)

(72) Inventor: Charles Renz, Braircliff, NY (US)

(73) Assignee: JMBH Holdings, LLC, Shelton, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/811,406

(22) Filed: Jul. 8, 2022

(65) Prior Publication Data

US 2022/0339075 A1 Oct. 27, 2022

Related U.S. Application Data

(60) Division of application No. 16/297,951, filed on Mar. 11, 2019, now Pat. No. 11,400,024, which is a continuation of application No. 14/813,465, filed on Jul. 30, 2015, now abandoned, which is a continuation of application No. 14/036,949, filed on
(Continued)

(51) Int. Cl.
*A61J 9/04* (2006.01)

(52) U.S. Cl.
CPC ........... *A61J 9/04* (2013.01); *Y10T 137/7897* (2015.04)

(58) Field of Classification Search
CPC ...... A61J 9/04; Y10T 137/7897; B65D 51/16; F16K 17/18
See application file for complete search history.

(56) References Cited

U.S. PATENT DOCUMENTS

| 1,912,895 A | 6/1933 | Fritz |
| 1,972,895 A | 9/1934 | Maccoy |

(Continued)

FOREIGN PATENT DOCUMENTS

| CA | 2219398 | 4/1998 |
| FR | 1058610 | 3/1954 |

(Continued)

OTHER PUBLICATIONS

International Search Report and Written Opinion dated May 22, 2008 from corresponding International Patent Application No. PCT/US2007/026043.

(Continued)

*Primary Examiner* — Don M Anderson
(74) *Attorney, Agent, or Firm* — Getz Balich LLC

(57) ABSTRACT

A vent valve, and a vent valve assembly, for a liquid dispensing container, employ a vent disc having small open vent holes in cooperation with an overlying thin flexible flap that covers and closes the vent holes to limit liquid pressure on the holes when the container is upright, yet require little suction pressure to move the flap to draw liquid or vent through the holes. The vent valve can be used in a bottom cap that is attachable to the bottom open end of the container. The vent valve assembly includes such a bottom cap, a sealing member for sealing the bottom cap to the container, and a vent valve. The vent valve and/or bottom cap have an elevated vent disc and a top portion having the thin flexible flap.

20 Claims, 26 Drawing Sheets

Related U.S. Application Data

Sep. 25, 2013, now Pat. No. 10,500,137, which is a division of application No. 13/053,789, filed on Mar. 22, 2011, now Pat. No. 8,567,619, which is a division of application No. 12/004,129, filed on Dec. 20, 2007, now Pat. No. 8,016,142.

(60) Provisional application No. 60/875,899, filed on Dec. 20, 2006.

(56) References Cited

U.S. PATENT DOCUMENTS

| | | |
|---|---|---|
| 1,976,450 A | 10/1934 | Lowe et al. |
| 1,982,538 A | 11/1934 | Reedy |
| 2,043,186 A | 6/1936 | O'Dette |
| 2,060,212 A | 11/1936 | Herstein |
| 2,084,099 A | 6/1937 | Maccoy |
| 2,349,722 A | 5/1944 | Hayter |
| 2,365,947 A | 12/1944 | Ganson |
| 2,394,722 A | 2/1946 | Sloane |
| 2,414,697 A | 1/1947 | Pettersson |
| 2,425,609 A | 8/1947 | Fink |
| 2,525,745 A | 10/1950 | Wycoff |
| 2,543,163 A | 2/1951 | Greiner |
| 2,546,681 A | 3/1951 | Searer |
| 2,582,489 A | 1/1952 | Krueger |
| 2,715,980 A | 8/1955 | Frick |
| 2,729,505 A | 1/1956 | Harvey |
| 2,774,500 A | 12/1956 | Budiani |
| 2,851,201 A | 9/1958 | Poitras et al. |
| 2,876,935 A | 3/1959 | Lindberg |
| 2,888,685 A | 6/1959 | Giangrosso et al. |
| 2,907,485 A | 10/1959 | Lunden |
| 2,960,088 A | 11/1960 | Witz |
| 2,965,310 A | 12/1960 | Gettelman |
| 2,982,432 A | 5/1961 | Mehl |
| 3,113,687 A | 12/1963 | Butts |
| 3,134,495 A | 5/1964 | Carbonel |
| 3,217,574 A | 11/1965 | Nauta et al. |
| 3,247,630 A | 4/1966 | Kesting |
| 3,292,808 A | 12/1966 | Greene |
| 3,326,242 A | 6/1967 | Parkison |
| 3,342,419 A | 9/1967 | Weese |
| 3,358,864 A | 12/1967 | Meierhoefer |
| 3,393,817 A | 7/1968 | Meierhoefer |
| 3,511,407 A | 5/1970 | Palma |
| 3,617,059 A | 11/1971 | Grant |
| 3,718,140 A | 2/1973 | Yamauchi |
| 3,768,682 A | 10/1973 | Meyers et al. |
| 3,851,781 A | 12/1974 | Marco |
| 3,883,025 A | 5/1975 | Jemmett |
| 4,010,861 A | 3/1977 | Welten |
| 4,135,513 A | 1/1979 | Arisland |
| 4,215,785 A | 8/1980 | Schwaiger |
| 4,311,245 A | 1/1982 | Maffei |
| 4,401,224 A | 8/1983 | Alonso |
| 4,545,491 A | 10/1985 | Bisgaard et al. |
| 4,648,519 A | 3/1987 | Kennedy |
| 4,685,577 A | 8/1987 | Chen |
| 4,723,668 A * | 2/1988 | Cheng ........................ A61J 9/04 220/DIG. 7 |
| 4,750,647 A | 6/1988 | Cohen |
| 4,796,937 A | 1/1989 | Andrea |
| 4,815,615 A | 3/1989 | Phlaphongphanich |
| 4,818,114 A | 4/1989 | Ghavi |
| 4,828,126 A | 5/1989 | Vincinguerra |
| 4,842,165 A | 6/1989 | Van Coney |
| 4,865,207 A | 9/1989 | Joyner et al. |
| 4,928,836 A | 5/1990 | Wu et al. |
| 4,940,151 A | 7/1990 | Fett |
| 4,964,659 A | 10/1990 | Baldwin |
| 4,993,568 A | 2/1991 | Morifuji et al. |
| 5,069,351 A | 12/1991 | Gunderson |
| 5,071,017 A | 12/1991 | Stull |
| 5,078,287 A | 1/1992 | Holmes, III |
| 5,079,013 A | 1/1992 | Belanger |
| 5,101,991 A | 4/1992 | Morifuji et al. |
| 5,133,482 A | 7/1992 | Burrows et al. |
| 5,165,178 A | 11/1992 | Seely |
| 5,169,035 A | 12/1992 | Imbery, Jr. |
| 5,186,559 A | 2/1993 | Fu |
| 5,215,312 A | 6/1993 | Knappe et al. |
| D338,531 S | 8/1993 | Howell |
| 5,232,110 A | 8/1993 | Purnell |
| 5,339,971 A * | 8/1994 | Rohrig ....................... A61J 9/04 220/373 |
| D357,439 S | 4/1995 | Haut et al. |
| 5,402,908 A | 4/1995 | Warden et al. |
| 5,431,290 A | 7/1995 | Vinciguerra |
| 5,433,353 A | 7/1995 | Flinn |
| D362,554 S | 9/1995 | Grundner |
| 5,474,193 A | 12/1995 | Larsson et al. |
| 5,499,729 A * | 3/1996 | Greenwood ............... A61J 9/04 215/261 |
| 5,544,766 A | 8/1996 | Dunn et al. |
| 5,553,731 A | 9/1996 | Schuyler |
| 5,560,513 A | 10/1996 | Jarrell |
| 5,601,199 A | 2/1997 | Marty |
| 5,607,074 A | 3/1997 | De Gennaro |
| 5,692,627 A | 12/1997 | Feng |
| 5,699,719 A | 12/1997 | Lucas et al. |
| 5,699,921 A | 12/1997 | Rodriguez |
| 5,791,503 A | 8/1998 | Lyons |
| 5,799,808 A | 9/1998 | Oh |
| 5,901,867 A | 5/1999 | Mattson |
| 6,053,342 A | 4/2000 | Chomik |
| 6,082,183 A | 7/2000 | Huber |
| 6,138,710 A | 10/2000 | Chomik et al. |
| 6,206,220 B1 | 3/2001 | Stodd |
| 6,209,736 B1 | 4/2001 | Chen et al. |
| 6,244,452 B1 | 6/2001 | Morano |
| D445,193 S | 7/2001 | Manganiello et al. |
| 6,253,935 B1 | 7/2001 | Fletcher |
| 6,375,028 B1 | 4/2002 | Smith |
| 6,398,048 B1 | 6/2002 | Kevorkian |
| 6,446,822 B1 * | 9/2002 | Meyers ..................... A61J 9/001 215/11.5 |
| 6,601,720 B2 | 8/2003 | Meyers et al. |
| 6,616,000 B1 | 9/2003 | Renz |
| 6,662,827 B1 | 12/2003 | Clougherty et al. |
| 6,776,301 B2 | 8/2004 | Torres-White et al. |
| 7,163,113 B2 | 1/2007 | Manganiello et al. |
| D577,199 S | 9/2008 | Zhuan |
| 7,866,495 B2 * | 1/2011 | Rohrig ...................... A61J 9/04 215/11.1 |
| 8,016,142 B2 * | 9/2011 | Renz ......................... A61J 9/04 215/11.1 |
| 8,567,619 B2 * | 10/2013 | Renz ......................... A61J 9/04 220/717 |
| 8,579,133 B2 | 11/2013 | Marcus |
| 10,500,137 B2 * | 12/2019 | Renz ......................... A61J 9/04 |
| D886,984 S | 6/2020 | Weiss et al. |
| D921,387 S | 6/2021 | Wang |
| 2002/0050481 A1 | 5/2002 | Manganiello et al. |
| 2003/0000907 A1 | 1/2003 | Kevorkian et al. |
| 2003/0024895 A1 | 2/2003 | Meyers et al. |
| 2004/0118801 A1 | 6/2004 | Brown et al. |
| 2004/0173556 A1 | 9/2004 | Smolko et al. |
| 2004/0200798 A1 | 10/2004 | Ekkert |
| 2005/0056610 A1 | 3/2005 | Randolph |
| 2006/0060555 A1 | 3/2006 | Ma et al. |
| 2006/0169694 A1 | 8/2006 | Kemper |
| 2006/0226171 A1 | 10/2006 | Sternberg |
| 2007/0068890 A1 * | 3/2007 | Rohrig ................. A61J 11/0065 215/11.4 |
| 2007/0163984 A1 | 7/2007 | Nguyen |
| 2008/0011708 A1 | 1/2008 | Rappin |
| 2008/0142467 A1 | 6/2008 | Giles |
| 2008/0302751 A1 | 12/2008 | Segovia, Jr. |
| 2010/0193460 A1 | 8/2010 | Driver |
| 2014/0027403 A1 | 1/2014 | Renz |
| 2015/0144584 A1 | 5/2015 | Renz |
| 2016/0090216 A1 | 3/2016 | Joyce |

(56) References Cited

U.S. PATENT DOCUMENTS

FOREIGN PATENT DOCUMENTS

| | | |
|---|---|---|
| FR | 2640875 | 6/1990 |
| FR | 2863590 | 6/2005 |
| GB | 1432798 | 4/1976 |
| GB | 2190596 | 11/1987 |
| GB | 2238729 | 8/1993 |
| GB | 2318573 | 4/1998 |
| JP | 10-127734 | 5/1998 |
| WO | WO 1990/007320 | 7/1990 |
| WO | 9014066 W | 11/1990 |
| WO | WO 1992/021312 | 12/1992 |
| WO | WO 1998/018427 | 10/1996 |
| WO | WO 1999/011218 | 9/1998 |
| WO | WO 1999/002978 | 1/1999 |
| WO | WO 2003/008289 | 1/2003 |
| WO | WO 2005/041851 | 5/2005 |

OTHER PUBLICATIONS

Office action for U.S. Appl. No. 16/772,098 dated Oct. 6, 2021.
Office action for U.S. Appl. No. 16/772,098 dated Jun. 7, 2022.
Notice of Allowance for U.S. Appl. No. 16/772,098 dated Sep. 28, 2022.

\* cited by examiner

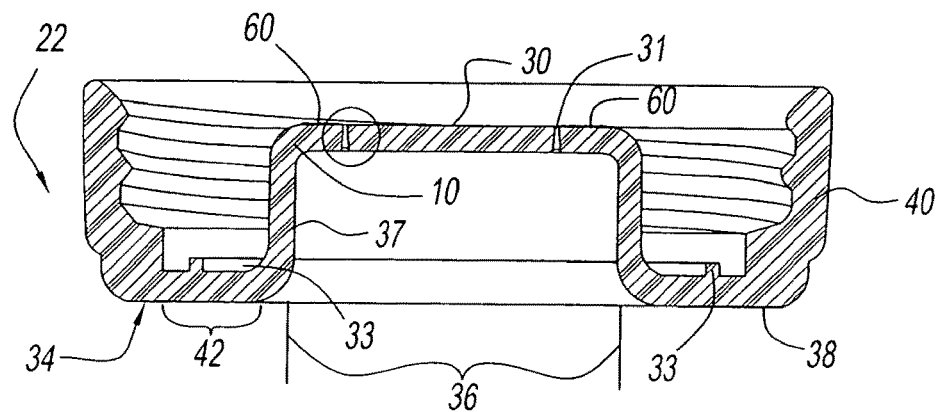
Fig. 7
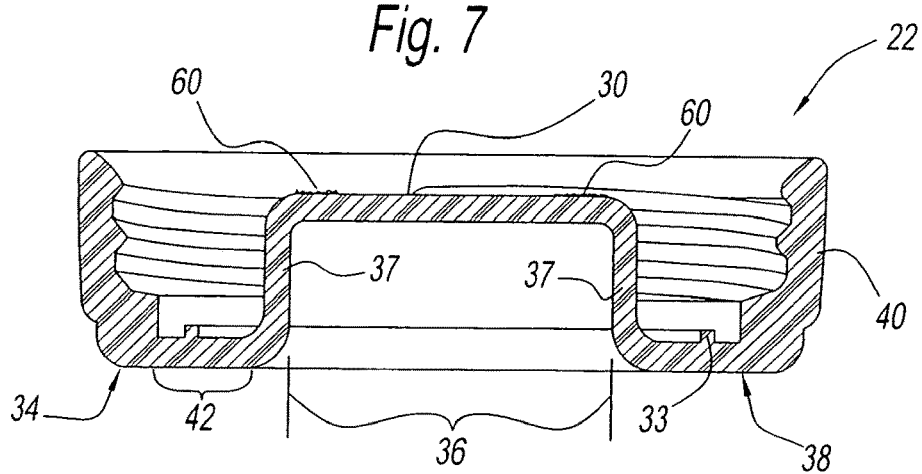
Fig. 8
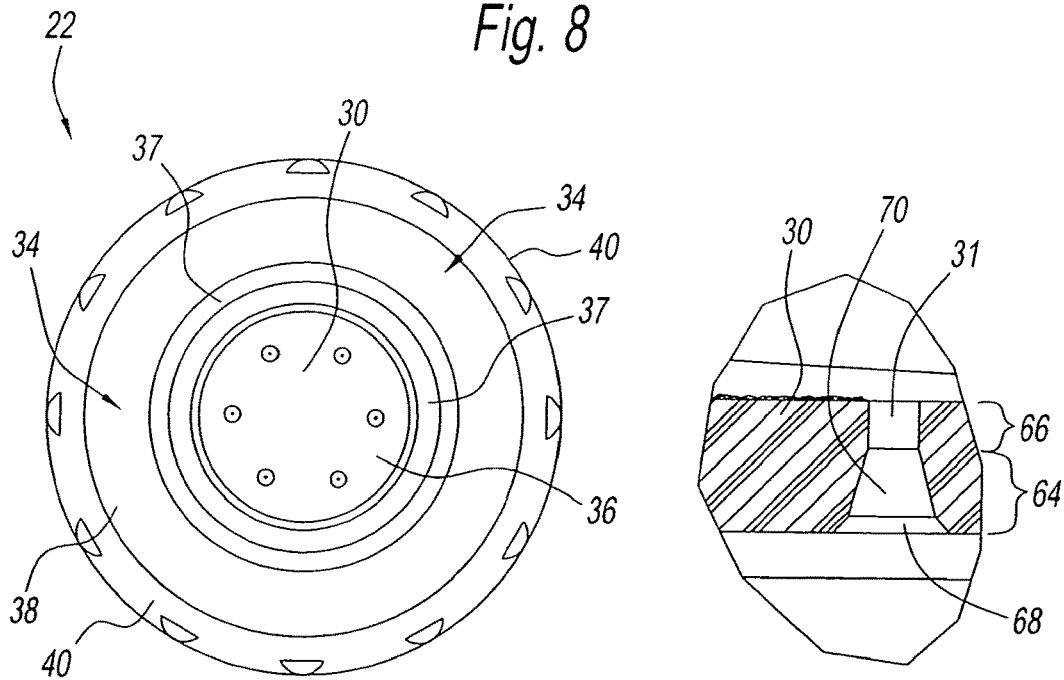
Fig. 9
Fig. 10

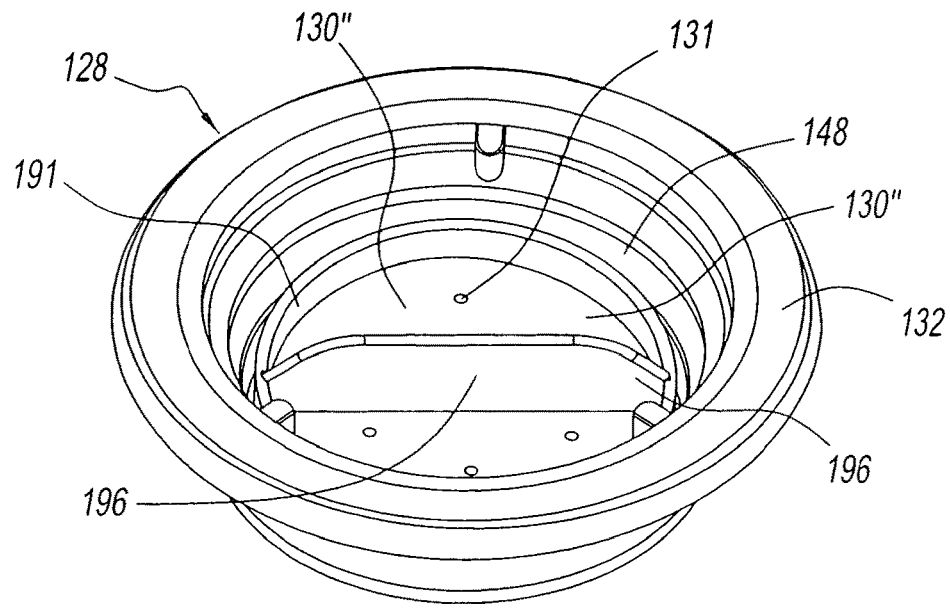
Fig. 40
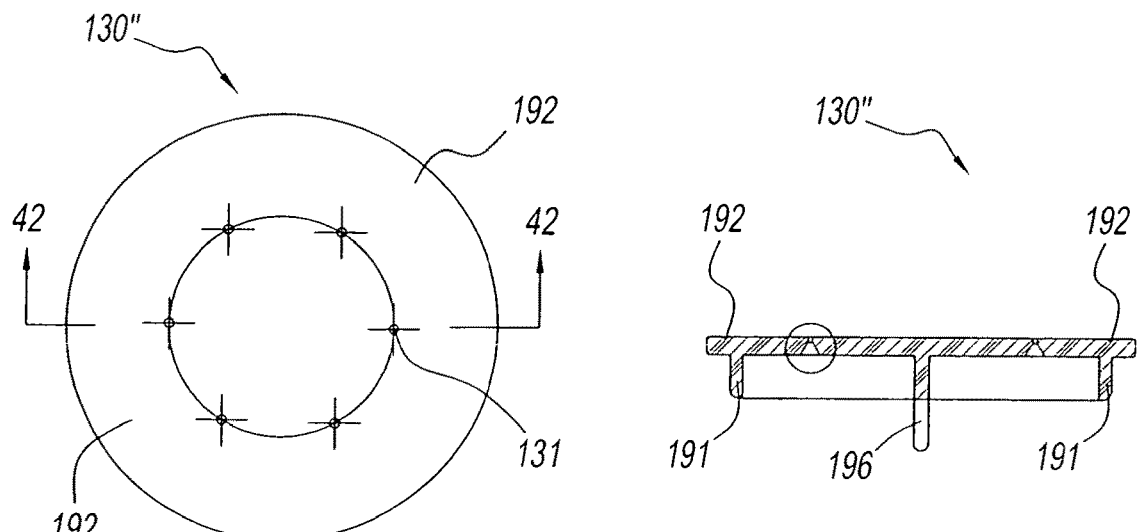
Fig. 41
Fig. 42
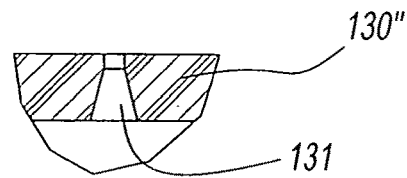
Fig. 43

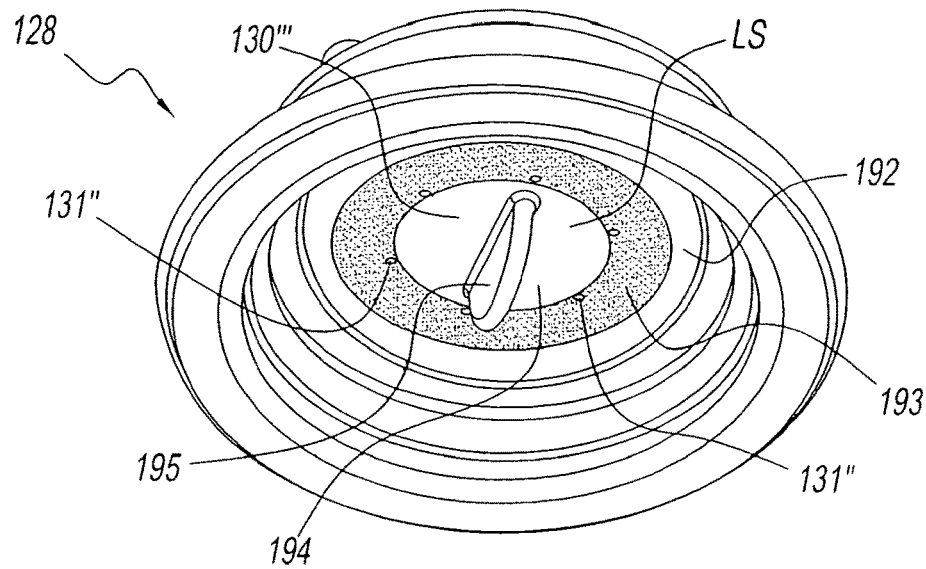
Fig. 48
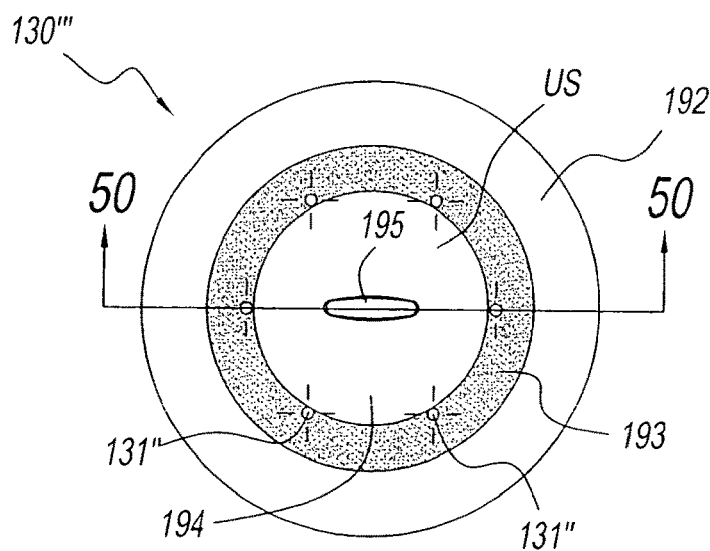
Fig. 49
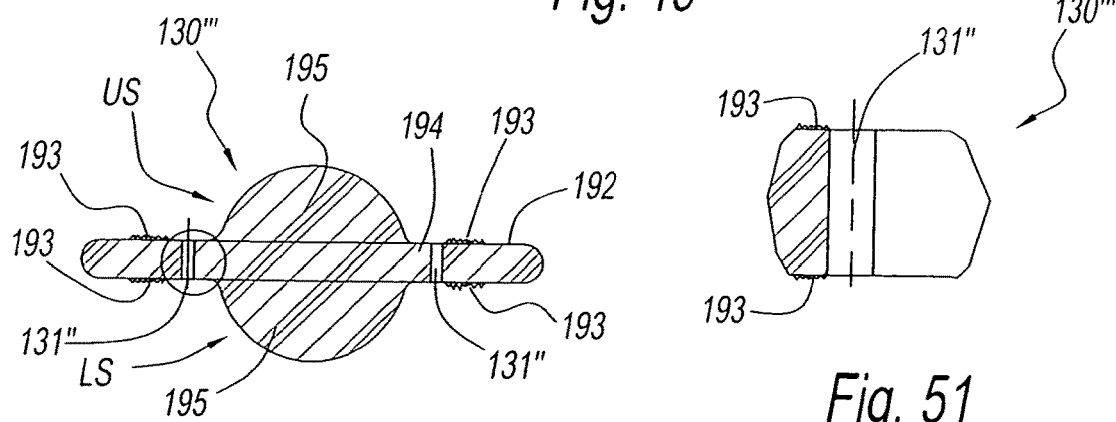
Fig. 50
Fig. 51

VENT VALVE ASSEMBLIES FOR BABY BOTTLES

CROSS-REFERENCE TO RELATED APPLICATIONS

This is a divisional application of U.S. patent application Ser. No. 16/297,951, filed Mar. 11, 2019, which is a continuation application of co-pending U.S. patent application Ser. No. 14/813,465, filed Jul. 30, 2015, which is a continuation application of U.S. patent application Ser. No. 14/036,949, filed Sep. 25, 2013, which is a divisional application of U.S. application Ser. No. 13/053,789, filed on Mar. 22, 2011, now U.S. Pat. No. 8,567,619, which in turn is a divisional application of U.S. application Ser. No. 12/004,129, filed on Dec. 20, 2007, now U.S. Pat. No. 8,016,142, which is based on and claims the priority and benefits of U.S. Provisional Application Ser. No. 60/875,899, filed Dec. 20, 2006, now, the contents of all of which are incorporated by reference herein.

BACKGROUND OF THE INVENTION

A. Field of the Invention

The present invention relates to liquid dispensing containers that require venting, including drinking and feeding containers, for example, infant feeding bottles and cups. More particularly, the present invention relates to vent systems, including vent valves, vents and the like that are located at the bottom of such containers, to alleviate vacuum created in the containers during feeding. The present invention also relates to such vent systems that also prevent liquid from leaking from the containers

B. Description of Related Art

Baby liquid feeding bottles have vent systems or means designed to allow air to flow into the bottle to alleviate the vacuum created in the bottle during feeding. Such baby bottles typically employ a nipple and are vented at the flange of the nipple. This is effective for alleviating the vacuum and dispensing the liquid but it allows air to enter the liquid and then be swallowed by the baby. The swallowed air can cause gas and colic. To keep air out of the liquid during feeding and to prevent the air from being swallowed by the feeding baby, some baby feeding bottles been designed with vents removed from the nipples and placed at or near the bottom of the bottles. Such a venting system employs an elastomeric or silicone diaphragm with a plurality of slits therethrough. The slits are normally closed. They open to allow air to vent into the bottle when the baby sucks on the nipple to apply a negative pressure inside of the bottle. The slits close when the baby stops sucking on the nipple and the negative pressure is no longer applied. Such a venting system has proven effective for alleviating the vacuum, while also preventing leakage.

However, the aforementioned and other bottom venting systems that employ slits in flexible members such as diaphragms can be further improved in that the baby who is feeding needs to apply sufficient sucking pressure to the nipple to open the slit vents for venting vacuum and to actuate flow of the contained liquid, for example milk or formula. Since baby bottles employing bottom venting systems may contain about five to about six inches of liquid, the need of the infant to apply a sucking pressure to activate a slit venting system could be perceived as a problem in connection with placing a strain on infants having sensitive, developing or infected ears. Another area for improvement is associated with slit flexible members and the silicone materials by which they are made. When such materials are slit, the materials begin to heal at the slit, over time. The bonds in the slit silicone begin to reform such that the slits will not open as easily as when initially formed. When this occurs, the activation suction pressure to open the slits increases to a level higher than was initially required to activate the slit vent. Occasionally, the slits heal enough that they cannot open at all, and the infant cannot feed from the bottle. A further area for possible improvement is with respect to the use of silicone material itself as the flexible venting or valve member. While silicone generally is a suitable material, for example in that slits formed in silicone flexible members do not begin to open due to dishwashing and boiling heat, the material is very expensive. It would be desirable to develop a venting system that does not require that the flexible venting or valve member be made of a silicone material.

SUMMARY OF THE INVENTION

The present disclosure provides a vent valving system and assembly that overcomes the aforementioned and other problems.

The present disclosure also provides an improved vent valve and vent valve assembly that alleviates the vacuum created in a liquid dispensing container, for example, an infant feeding bottle, during feeding.

The present disclosure further provides an improved vent valve and vent valve assembly that does not leak.

The present disclosure still further provides an improved vent valve and vent valve assembly that employs a vent disc that has a plurality of small open vent holes therethrough that do not heal or close over time.

The present disclosure also provides an improved vent valve and vent valve assembly that requires very little, or next to no suction pressure to open the valve to allow air through the vent holes into the container to alleviate the vacuum created upon feeding.

The present disclosure further provides an improved vent valve and vent valve assembly that, by use of a vent disc with a plurality of small open vent holes therethrough, requires less sucking pressure to open the valve to allow air through the holes into the container to alleviate the vacuum created upon feeding, as compared to the sucking pressure required to open conventional closed slits, and accordingly is less likely to strain a feeding baby's sensitive ears and system.

The present disclosure still further provides an improved vent valve and vent valve assembly that employs a vent disc that has a plurality of small open vent holes therethrough, in cooperation with a vent valve having a thin flexible flap or baffle that closes or covers the vent holes to limit liquid pressure on the holes when the feeding bottle is upright, and yet that requires very little suction pressure to move the flap or baffle to vent through the holes to alleviate the vacuum reated during feeding.

The present disclosure yet further provides a improved vent valve assembly for the bottom end of a liquid dispensing container, for example, a baby's feeding container, the vent valve assembly having a bottom end cap for attachment or connection to the open bottom end of the container and that has a bottom wall with at least one opening therethrough, a rigid vent disc located above the bottom wall and that has at least one hole therethrough, and a vent valve having a flexible flap or baffle that covers and closes the at least one hole in the vent disc, and moves the flap or baffle to open the hole to alleviate the vacuum created in the container during feeding.

The present disclosure also provides an aforementioned vent valve assembly that is easy to assemble and disassemble.

The present disclosure further provides an aforementioned vent valve assembly that is easy to clean.

BRIEF DESCRIPTION OF THE DRAWINGS

FIG. 7 is a vertical sectional view as would be seen along line 7-7 of FIG. 6;

FIG. 8 is a vertical sectional view as would be seen along line 8-8 of FIG. 6;

FIG. 9 is a bottom plan view of the bottom cap of FIG. 5;

FIG. 10 is an enlarged view of a vertical section taken through one of the vent holes in the bottom cap shown in FIG. 7;

FIG. 40 is a bottom perspective view of another embodiment of a vent valve assembly of the invention, with a modified vent disc;

FIG. 41 is a top plan view of the vent disc of FIG. 40;

FIG. 42 is a vertical sectional view as would be seen along line 42-42 of FIG. 41;

FIG. 43 is an enlarged vertical section through a vent hole shown in the encircled portion of FIG. 42;

FIG. 48 is a bottom perspective view of the vent valve assembly of FIG. 46;

FIG. 49 is a top plan view of the modified vent disc of FIG. 47;

FIG. 50 is a vertical sectional view as would be seen along line 50-50 of FIG. 49

FIG. 51 is an enlarged view of the encircled vertical section through a vent hole in the vent disc of FIG. 50.

DETAILED DESCRIPTION OF THE INVENTION

Figure 1:
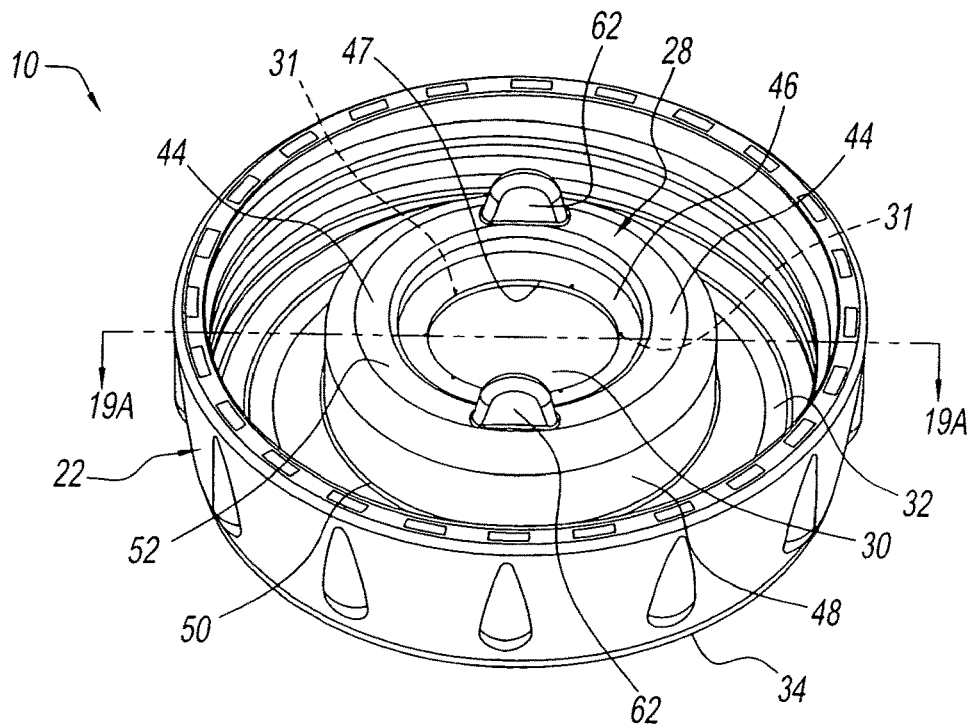
FIG. 1 is a top perspective view of a first embodiment of the vent valve assembly of the present invention.
Figure 19:
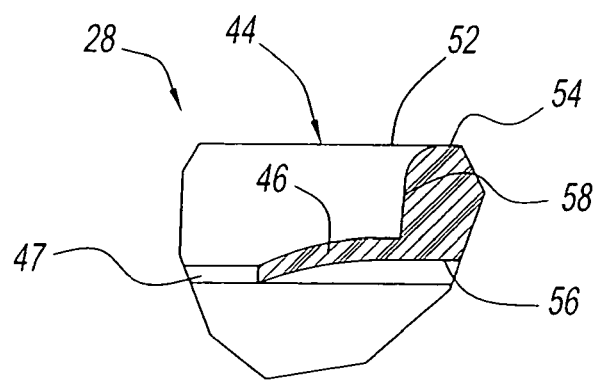
FIG. 19 is an enlarged view of the encircled portion of the flap shown in FIG. 18.
Figure 19A:
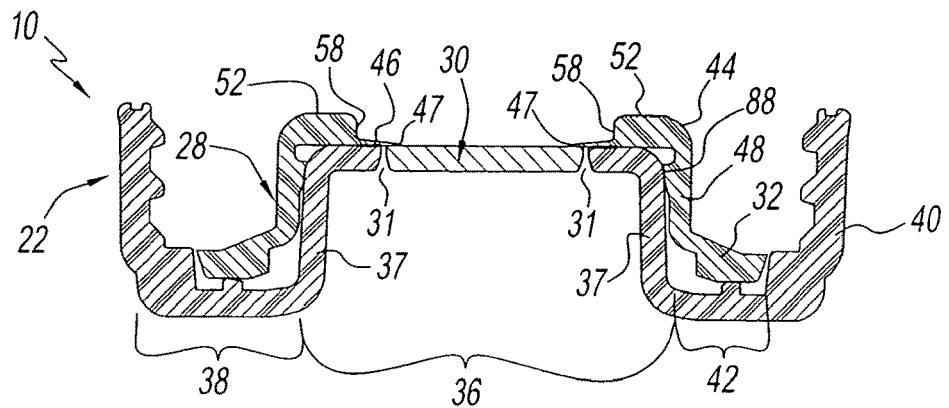
FIG. 19A is an enlarged vertical sectional view, with portions removed, as would be seen along line 19A-19A of the vent valve assembly shown in FIG. 1.
Figure 20:
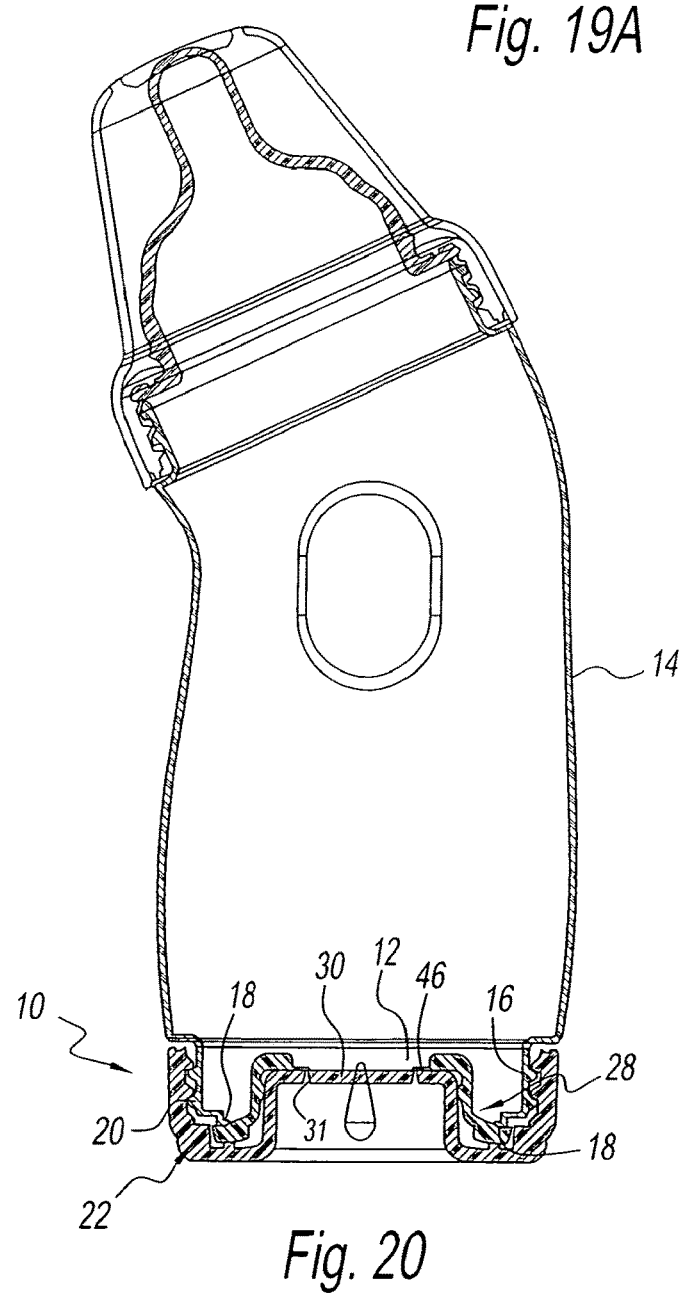
FIG. 20 is a schematic of a vertical sectional view taken through a baby bottle whose bottom end is attached or connected to a first embodiment of the vent valve assembly of the present invention shown in FIGS. 1 and 19.

Referring to the drawings in detail, and in particular to FIGS. 1, 19A and 20, FIG. 1 is a top perspective view of a preferred vent valve assembly of the invention, designated 10, for attachment or connection to the bottom open end 12 of a liquid dispensing container, for example, a baby bottle 14 (FIG. 20). Bottom open end 12 typically has a cylindrical neck 16, a downwardly directed sealing surface 18, and structure, for example, an external thread 20, for attaching bottom cap 22 to bottle 14.

Figure 2:
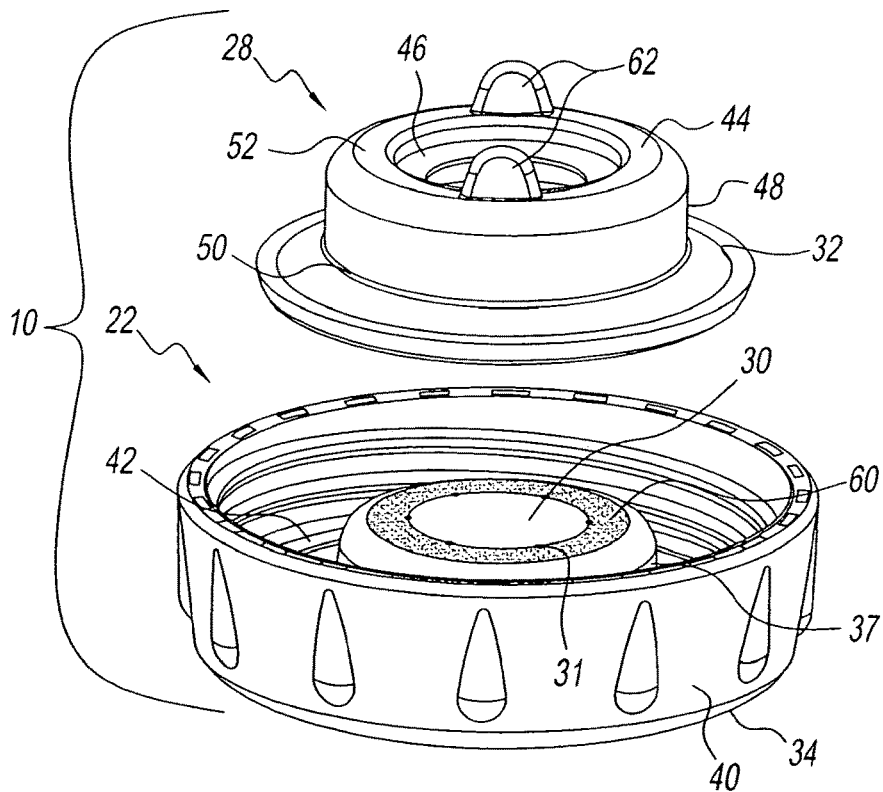
FIG. 2 is a top perspective exploded view of the valve assembly shown in FIG. 1.

FIG. 2 is an exploded top perspective view of the vent valve assembly of FIG. 1.

As shown in FIGS. 1 through 4, vent valve assembly 10 is comprised of bottom cap 22, a vent valve 28, a vent disc 30 and a sealing member 32. As also shown in FIGS. 5 through 11, bottom cap 22 is comprised of a bottom wall 34 having a central portion 36, a peripheral portion 38 surrounding central portion 36, and a side wall 40 that extends upwardly from peripheral portion 38. Side wall 40 has an interior surface with structure, for example threads, to attach or connect bottom cap 22 to bottom open end 12 of baby bottle 14. Central portion 36 includes an upwardly directed inner wall, here exemplarily shown as a cylindrical wall 37 that extends from the radially inner portion of peripheral portion 38 upwardly to and merges with the radially outer portion of vent disc 30. Peripheral portion 38 has an interior surface that forms a seat 42 (FIGS. 6, 7 and 8) for receiving a sealing member 32 for sealing bottom cap 22 with the bottom open end of 12 of baby bottle 14 when the two are attached together. Sealing member 32 can be a conventional sealing structure, for example, a rubber, elastomeric, silicone or other suitable sealing ring (not shown). As will be explained, preferably sealing member 32 is part of vent valve 28.

Central portion 36 of bottom wall 34 of bottom cap 22 need not be, but preferably is raised relative to peripheral portion 38 of bottom wall 34. Central portion 36 preferably includes a rigid vent disc 30 having at least one small hole 31, preferably a plurality of small holes 31 therethrough. Vent disc 30 need not be, but as shown in this embodiment, it preferably is, integral or one-piece with, preferably raised, central portion 36 of bottom wall 34 of bottom cap 22. The plurality of vent holes 31, shown in this embodiment as six, is preferably arranged in an annular pattern extending about, and preferably within the or a peripheral portion of vent disc 30. Any suitable number, pattern or arrangement of vent holes can be employed. The vent hole or plurality of vent holes is or are to be coordinated with and located in positions so that the vent holes can be covered by the one or more flexible flaps of the present disclosure.

Figure 3:
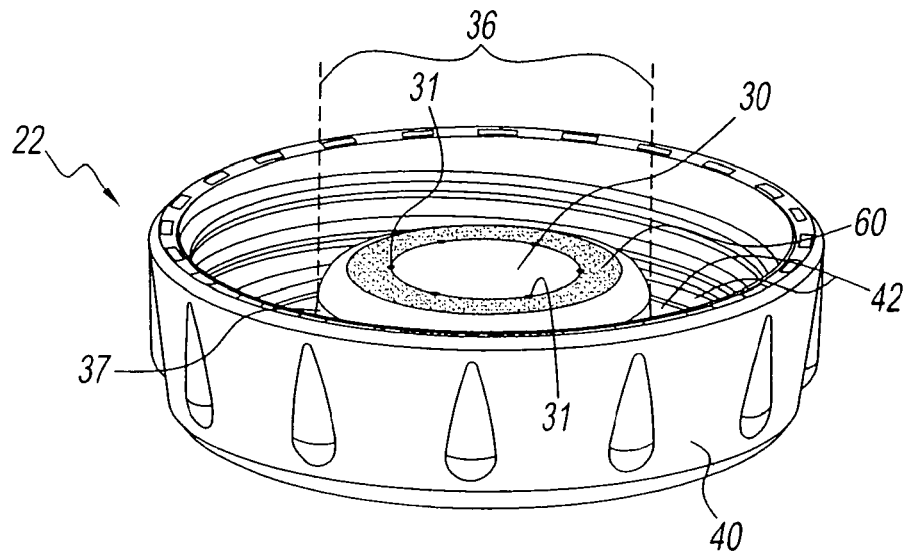
FIG. 3 is a top perspective view of the bottom cap of the vent valve assembly shown in FIG. 1.
Figure 4:
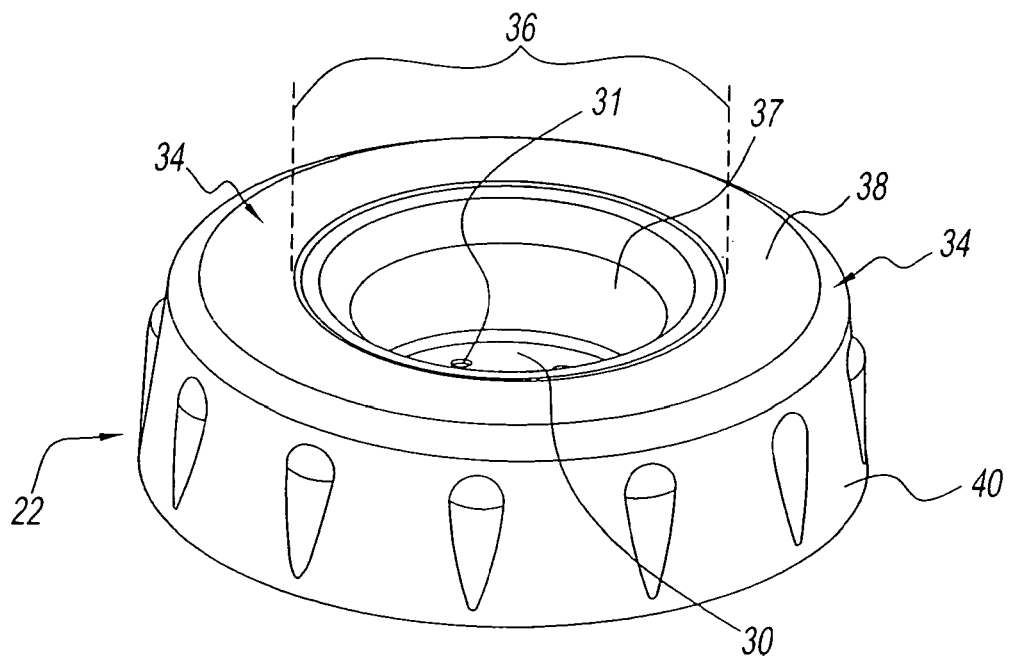
FIG. 4 is a bottom perspective view of the bottom cap shown in FIG. 3.

The top surface of vent disc 30 need not have, but preferably has a roughened or textured surface area or areas radially just outside of or peripheral to the vent hole or holes 31 to provide additional surface area to prevent thin flexible flap 46 from acting like a suction cup and sticking too tightly to the underlying upper surface of vent disc 30. FIGS. 2 and 3 show that, for example, when vent holes 31 are arranged in a circular or annular pattern, preferably a portion or all of the peripheral portion of the vent disc located just outside of the array or pattern of vent holes 31, here an annular portion or pattern, is textured as at 60. Texturing can be effected by any suitable method, preferably one performed during the bottom cap or vent disc molding process. Preferably, the upper surfaces of the vent discs employed in embodiments of the present disclosure have a peripheral portion and preferably it is substantially flat. Preferably, the portion(s), e.g., the peripheral portion(s) of the upper surface of vent disc 30 where vent hole(s) 31 reside, and/or the surface area(s) that are textured or that are contacted by flap 46, (is or) are substantially flat. That which is stated in this paragraph in connection with vent disc 30 also applies to other embodiments of vent discs of the present disclosure.

Although inwardly directed internal wall 37 of bottom cap 22 is shown as being cylindrical and axially extending, internal wall 37 can be of any suitable shape, e.g., domed, frustoconical, angled or sloped.

Figure 5:
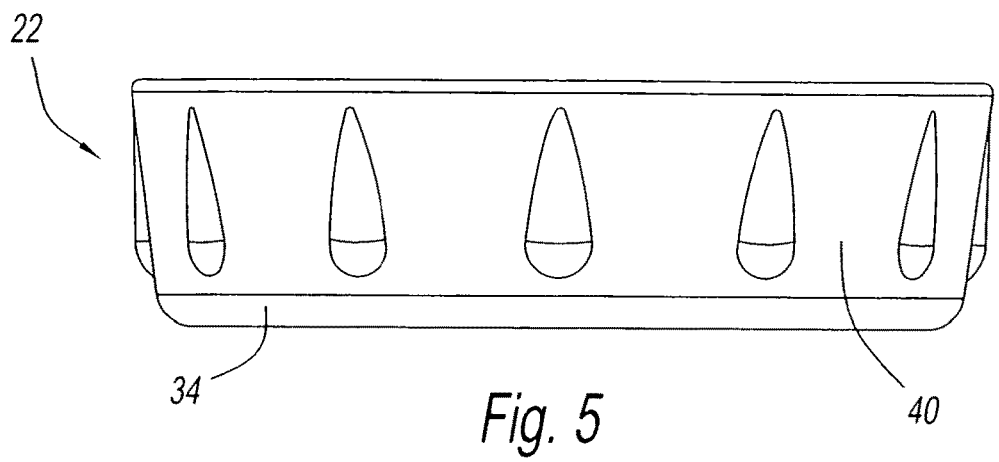
FIG. 5 is a side elevation of the bottom cap of FIG. 2.
Figure 6:
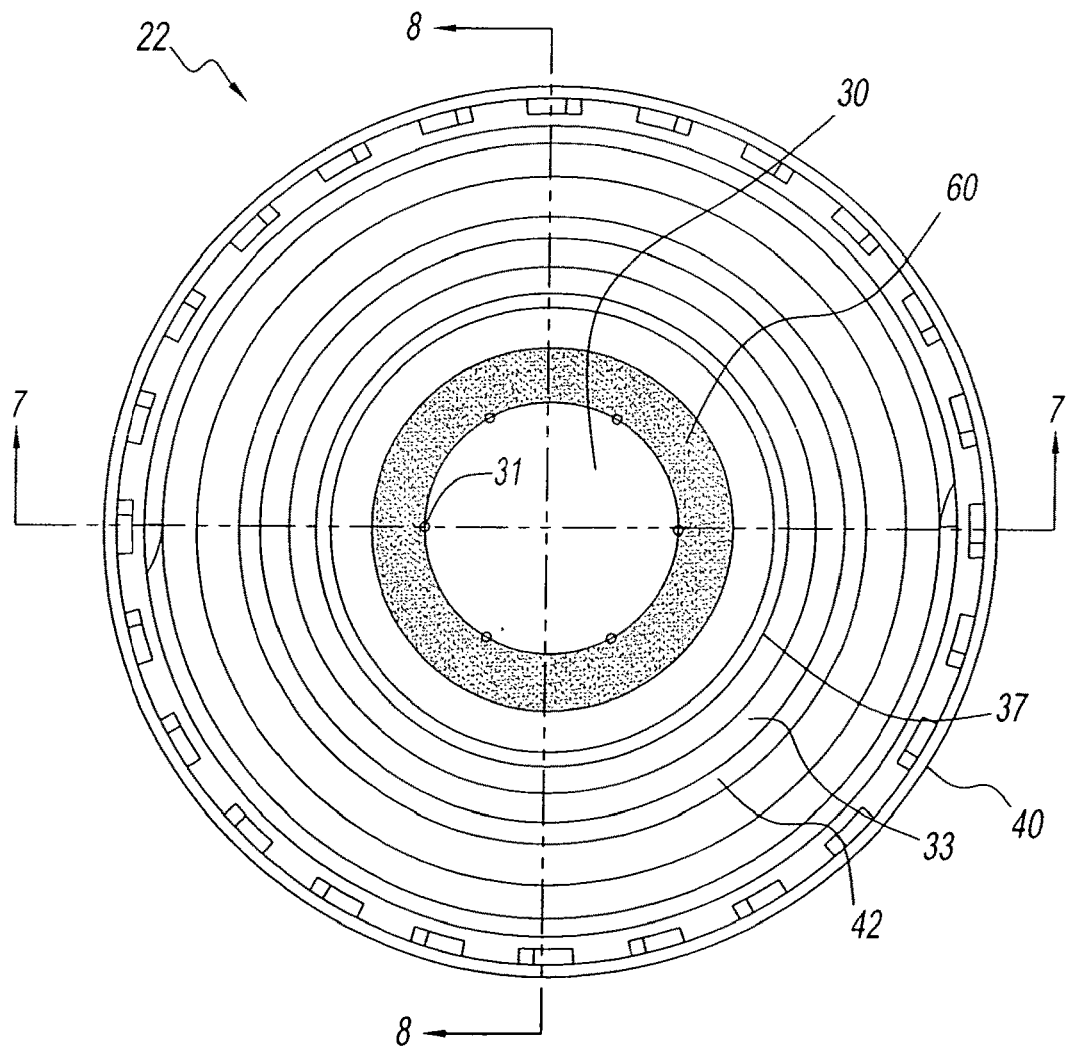
FIG. 6 is a top plan view of the bottom cap of FIG. 5.

FIG. 5 is a side elevation of, and FIG. 6 is a top plan view of bottom cap 22. FIG. 6 clearly shows integral vent disc 30 of raised central portion 36 having an annular arrangement or pattern of a plurality of vent holes 31, and just radially outside of the pattern, an annular peripheral textured surface area 60. FIG. 6 also shows seat 42 on the inside surface of peripheral portion 38 (not shown) of bottom wall 34, for receiving and seating therein a conventional sealing member (not shown) or peripheral sealing flange 32 of vent valve 28. Seat 42 includes a raised sealing ridge 33 on and against which the sealing member or peripheral sealing flange 32 is pressed by sealing surface 18 that partly defines the bottom opening of cylindrical neck 16 of baby bottle 14.

FIG. 7, a vertical section as would be seen along line 7-7 of FIG. 6 through vent holes 31 of bottom cap 22, and FIG. 8, a vertical section as would be seen along line 8-8 of bottom cap 22, show bottom cap 22 having bottom wall 34 comprised of raised central portion 36, peripheral portion 38 and side wall 40. Upwardly directed internal cylindrical wall 37 extends from the radially inner portion of peripheral portion 38 to and communicates with the radially outer portion of vent disc 30. FIGS. 7 and 8 show that the upper surface of the peripheral portion of vent disc 30 radially just outside of the annular pattern of vent holes 31 has an annular portion 60 that is textured.

FIG. 9 shows bottom cap 22 comprised of bottom wall 34 having a central portion 36 which in turn comprises integral vent disc 30, peripheral portion 38 surrounding central portion 36, and a side wall 40 that extends upwardly from peripheral portion 38.

FIG. 10, an enlarged view of the encircled vertical section portion taken through the left hand vent hole 31 in bottom cap 22 of FIG. 7, shows that the at least one vent hole 31 or each of the plurality of vent holes 31 preferably has a lower portion 64 and an upper portion 66. Lower portion 64 preferably has one or more tapered or frustoconical shaped portions, here shown as first frustoconical portion 68 and second intermediate frustoconical portion 70. Upper portion 66 preferably is cylindrical when viewed in vertical section. Desirably, both of frustoconical portions 68, 70 have larger diameters than upper portion 66.

Figure 11:
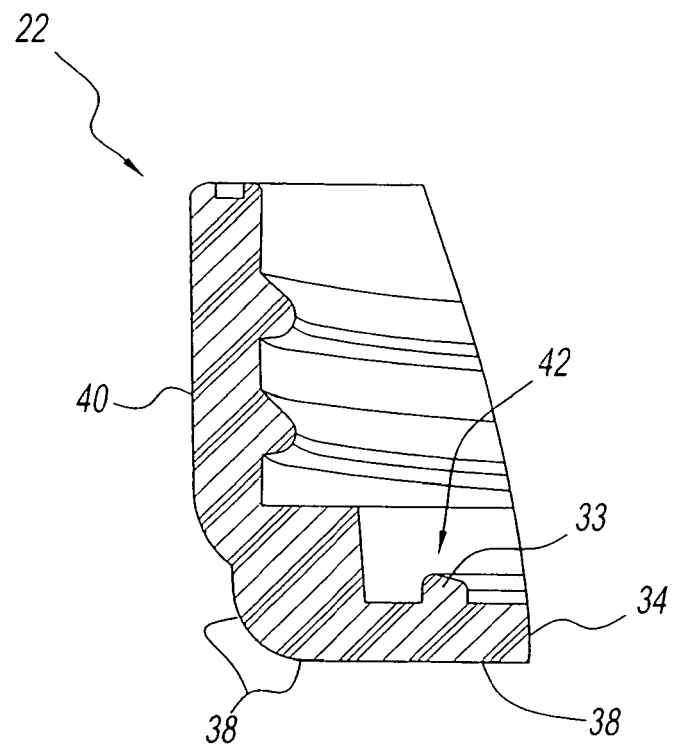
FIG. 11 is an enlarged view of a vertical section taken through the left portion of the bottom cap of FIG. 7.

FIG. 11, an enlarged view of the left side portion of the bottom cap 22 of FIG. 7, shows that the inside surface of peripheral portion 38 of bottom wall 34 of bottom cap 22 has a seat 42 with upstanding annular sealing ridge 33 on which can be seated a conventional sealing ring (not shown), orperipheral sealing flange 32 of vent valve 28 shown for example in FIGS. 1 and 2.

According to the present disclosure, small vent holes are employed in the vent discs of the vent valve assemblies of the disclosure. The size of the vent holes employed is sufficiently small to utilize the properties of surface tension of liquid and the capillary action of a liquid passing through a hole to permit reduced levels of suction pressure by the user of the vent valve assemblies, while at the same time preventing leakage through the holes. It has been found that for a baby bottle filled to full capacity of about 5.1 inches of liquid (water), the hole size (diameter) required to utilize these properties to prevent leakage is less than 0.11 mm. Hole sizes that small are impractical because they are very difficult to mold into a bottle component. Although holes having a diameter of about 0.55 mm (0.022 inch) can be molded, the properties involved with such a hole size will only hold off about 1 inch of liquid. A principle of the present disclosure is to use one or more small vent holes in a rigid disc and cover the hole(s) with a thin flexible baffle or flap to reduce the hydrostatic pressure from an overlying volume of liquid, in this example, about 5.1 inches of liquid, by preventing the overlying liquid from directly contacting and passing directly through the hole(s), while taking advantage of the properties of small holes to prevent leakage of small amounts of liquid through the vent holes. By preventing direct liquid contact, there will not be enough liquid pressure to overcome the hole forces that will allow the liquid to leak through the small vent holes. When the bottle is upright, the liquid weight will press the flexible membrane, baffle or flap down over the vent hole(s) to prevent leakage. If liquid seeps around the edges of, for example, the baffle or flap, the smallness of the vent hole(s) will prevent water from passing through them. When the bottle is turned upright during feeding, the baffle or flap is thin enough to that it can flex easily out of the way to give the vent hole(s) an air flow path. Although the vent hole(s) can be of any suitable shape, preferably the holes are tapered or frustoconical, primarily to make it easier to mold the holes during manufacturing of the parts or components that have the vent holes. The vent hole or holes can be cylindrical, tapered or frustoconical, or a combination thereof. While cylindrical vent holes are less preferred since they are more difficult to mold in small diameter sizes, it may be desirable to employ them in certain applications, for example, when it is desired to provide vent discs that are reversible.

It has been found that a suitable hole shape and size for vent hole(s) of vent discs of the invention, i.e., vent discs of or for a bottom cap 22 or of or for mounting to a vent valve of the invention, for a liquid dispensing container or bottle 14 whose capacity is about 5.1 inches of liquid (water), is that the diameter of the cylindrical upper portion 66 of the vent holes at the upper surface of, for example, the central portion 36 of vent disc 30 of bottom wall 34, is from about 0.010 inch to about 0.020 inch, and the diameter of the tapered or frustoconical lower portion 64 of the vent holes at the lower surface 64 of the vent disc is from about 0.030 inch to about 0.040 inch.

Given the principle of the present disclosure described above, a person of ordinary skill in the art, using well known mathematical equations, will be able to determine suitable, proper small vent hole sizes for his or her vent applications, given the inches of liquid capacity that the container or bottle is designed to hold, the flap or vent activation pressure desired for the age of the user and his or her sucking ability and condition.

While smaller vent holes are generally preferred over larger ones, without limitation, vent holes of vent discs of the invention can be in the range of from about 0.005 inch to about 0.125 inch, preferably from about 0.005 inch to about 0.035 inch.

As shown in FIG. 1, vent valve 28 is mounted on raised central panel 36 of bottom wall 34 of bottom cap 22 such that flexible flap 46 extends over and covers the plurality of vent holes 31 in underlying vent disc 30. As also shown in FIGS. 2 and 12 through 19A and 20, vent valve 28 has a top portion generally designated 44 and an upstanding member shown as cylindrical wall 48 that extends upward to and merges with top portion 44. Top portion 44 has a thin flexible radially inwardly extending flap 46 that contacts and covers the at least one vent hole 31 the plurality of vent holes 31 of the vent disc employed, such that when the liquid dispensing container, or baby bottle 14 is in an upright position, the weight of the liquid in the container above flap 46 presses the flap down over and closes the at least one vent hole or plurality of vent holes 31 to prevent direct contact of the overlying liquid with and leakage through the vent hole(s). When the container, or baby bottle 14 is in a tipped feeding or dispensing position, negative pressure during feeding or dispensing will cause thin flexible flap 46 to be drawn and flex easily away from the at least one vent hole 31 or plurality of vent holes 31 and provide a pathway for vent air to flow into baby bottle 14 and alleviate the vacuum created in the container during feeding or dispensing.

Figure 17:
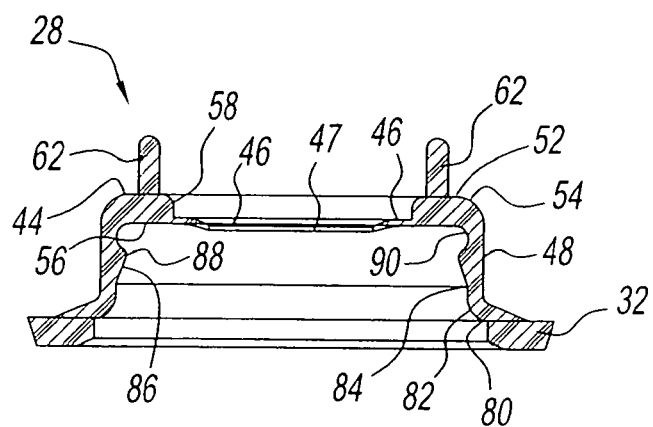
FIG. 17 is a vertical sectional view as would be seen along line 17-17 of FIG. 15.
Figure 18:
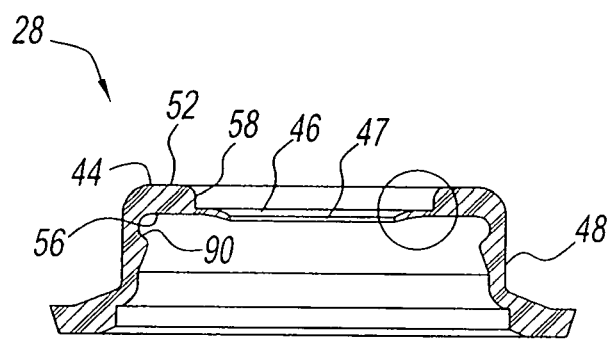
FIG. 18 is a vertical sectional view as would be seen along line 18-18 of FIG. 15.

Preferably, top portion 44 of vent valve 28 has a peripheral radially inwardly extending outer rim 52 that in turn has an upper surface 54, a lower surface 56, and a radially inward depending inner wall 58 joining upper surface 54 and lower surface 56. Although flap 46 can extend radially inward from any portion of top rim 44 or any portion of depending inner wall 58, preferably flap 46 extends radially inward from a lower portion of depending inner wall 58 (FIGS. 17-19). Vent valve 28 can have one or more protrusions placed at one or more convenient, accessible locations to facilitate grasping thereof and removal of vent valve 28 from or placement of vent valve 28 on raised central portion 36 of bottom cap 22, and/or if necessary from or on upstanding cylindrical wall 48. For example, as shown in FIGS. 1, 2, 12, 14 and 15, upper surface 54 of outer rim 52 of vent valve 28 can have two upwardly extending grasping tabs 62 disposed 180 degrees from each other to facilitate removal or replacement of vent valve 28.

Figure 12:
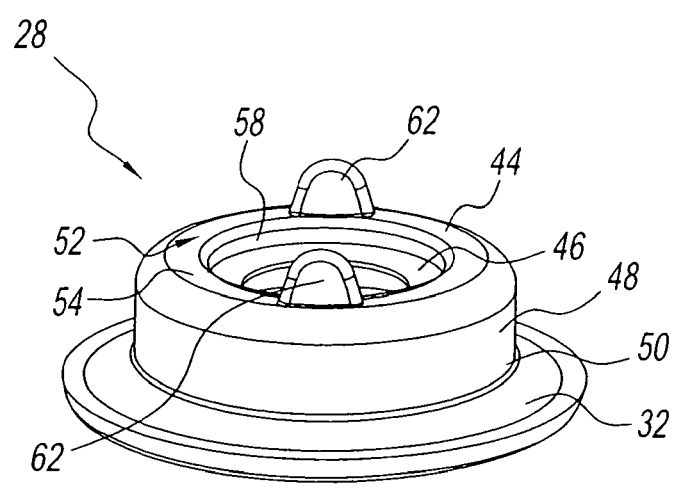
FIG. 12 is a top perspective view of the vent valve shown in FIG. 2.

FIG. 12 is a top perspective view of vent valve 28 as it is shown and discussed in connection with the exploded view of vent assembly 10 of FIG. 2. FIG. 12 shows that upstanding member 48 preferably is a wall or the like, preferably a cylindrical wall, and upstanding member 48 has a base portion 50 that merges with a sealing member 32, preferably comprising a peripheral sealing flange that integrally extends radially outward from base portion 50 of upstanding member 48 and sits in seat 42 formed by the interior surface of peripheral portion 38 of bottom cap 22.

Figure 13:
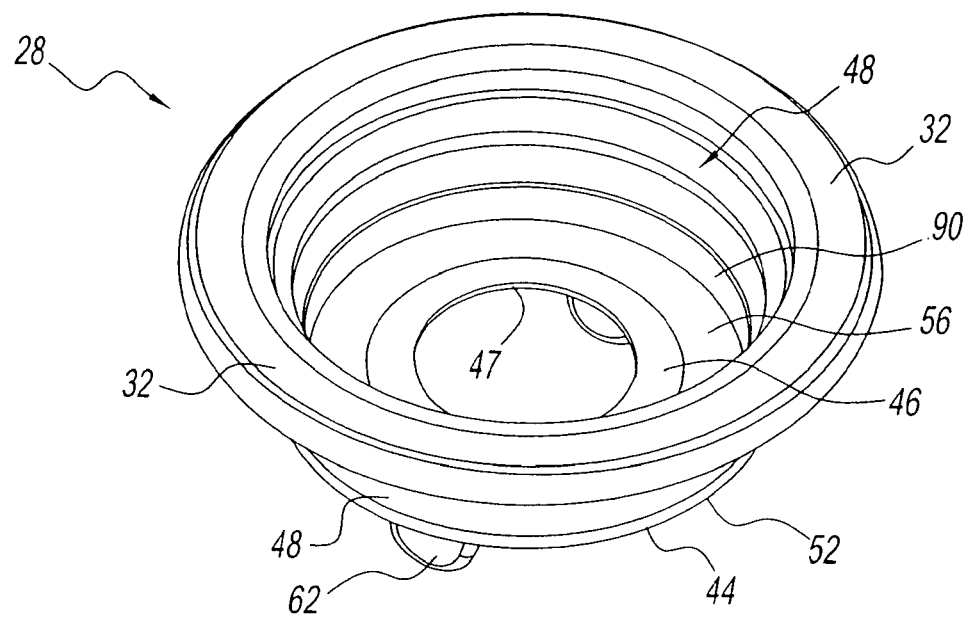
FIG. 13 is a bottom perspective view of the vent valve shown in FIG. 12.

FIG. 13, a bottom perspective view of vent valve 28 of FIG. 12, shows that lower surface 56 of outer rim 52 of top portion 44 extends radially inward into radially inwardly extending thin flexible annular flap 46 having a radially inner edge 47. FIG. 13 also shows the bottom surface of peripheral sealing flange 32, and the interior surface of generally cylindrical wall 48, here shown as a having two visible interior threads, and a radially outwardly extending annular groove 90 formed at the junction of cylindrical wall 48 and lower surface 56 of outer rim 52.

Figure 14:
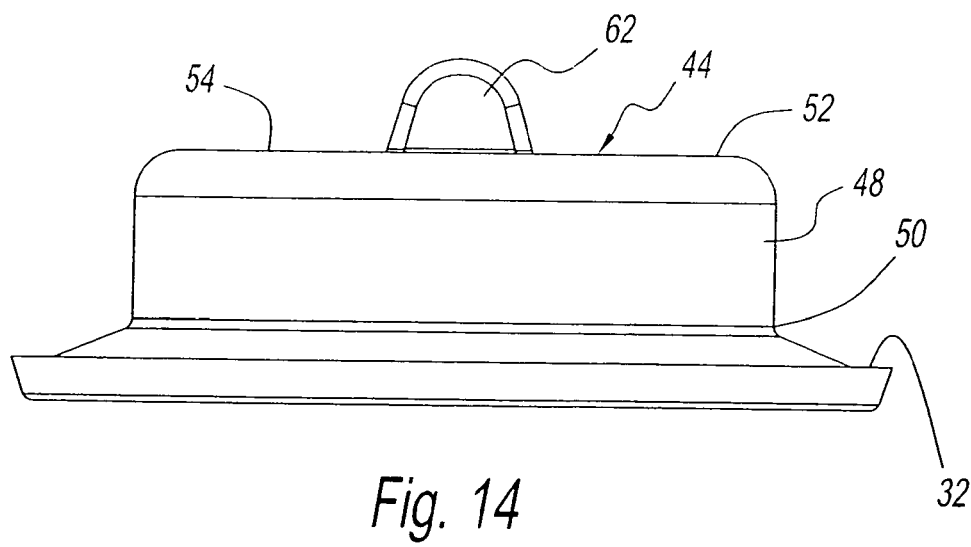
FIG. 14 is a side elevation of the vent valve shown in FIG. 12.

FIG. 14, a side elevation of vent valve 28 of FIG. 12, shows basically the same elements as shown in FIG. 12.

Figure 15:
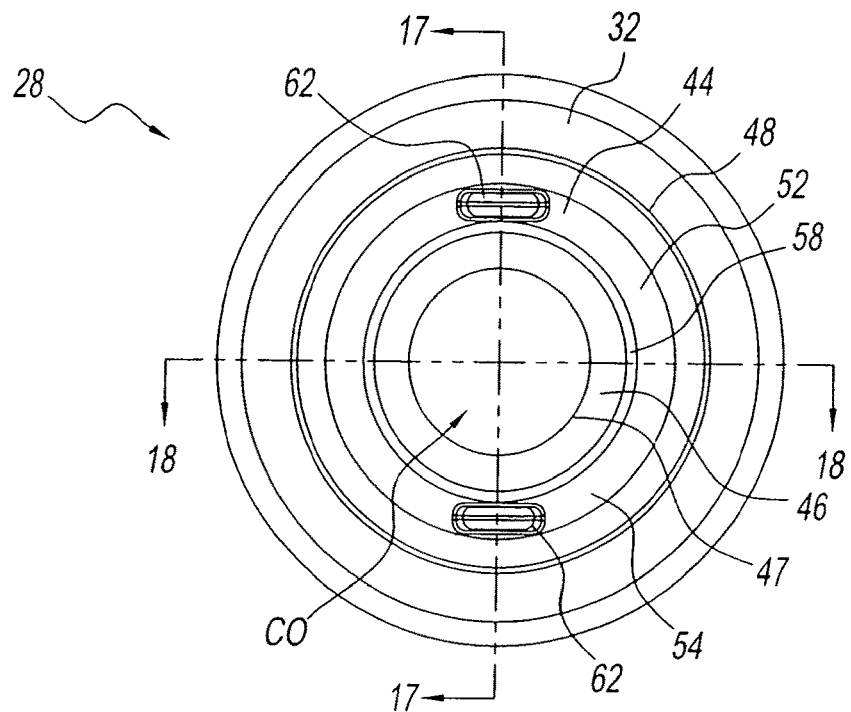
FIG. 15 is a top plan view of the vent valve shown in FIG. 14.

FIG. 15, a top plan view of vent valve 28 of FIG. 14, shows peripheral sealing flange 32, upstanding wall 48, top portion 44, outer rim 52, upper surface 54, and inner wall 58 that depends downwardly from outer rim 52 and from which radially inwardly extends annular flap 46. Flap 46 has radially inwardly extending annular inner edge 47 that defines a central opening CO. FIG. 15 also shows opposed grasping tabs 62 extending upwardly from outer rim 52.

Figure 16:
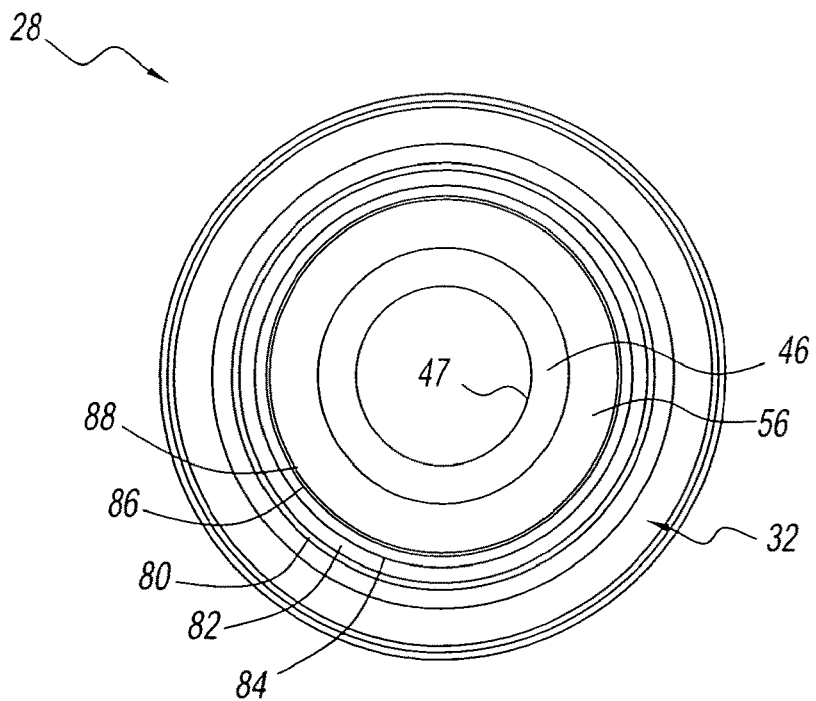
FIG. 16 is a bottom plan view of the vent valve shown in FIG. 14.

FIG. 16, a bottom plan view of vent valve 28 of FIG. 14, shows radially outwardly extending peripheral flange 32, and moving radially inward from it, the inside surface of upstanding member 48. The inside surface has a first undercut 80, a first transition portion 82, a second undercut 84, a second transition portion 86, and an abutment surface 88. Not visible in FIG. 16 above abutment surface 88 is a radially outward groove 90 that is available, but in this embodiment (which employs an integral vent disc 28) groove 90 is not used for mounting a vent disc therein.

FIGS. 17 and 18 are vertical sectional views as would be seen respectively along line 17-17, and line 18-18, of FIG. 15. FIGS. 16 and 17 each show the features of the inside surface of upstanding member 48 that were shown in plan view and discussed in connection with FIG. 15. It is to be noted, however, that with respect to the preferred first embodiment of the invention, some, most, many or all of those inside surface features can be eliminated, so long as vent valve 28 is easily mountable on and removable from central portion 36, and, when it is mounted thereon, or otherwise cooperatively related with the vent disc in accordance with this disclosure, their respective vertical axes are fairly co-linear, or the respective components of the vent valve assembly 10 of the invention (vent disc 30 and vent valve 28) are concentrically or otherwise cooperatively aligned, so that flap 46, or multiple flaps, however designed, cover(s) and operate(s) as intended with respect to vent hole(s) 31 of vent disc 30. It is envisioned for example that it may be desirable to design the inside surface of upstanding member 48 to merely employ or include an inwardly angled lead-in surface to facilitate the mounting of vent valve 28 onto central portion 36 of bottom cap 22 and to stabilize vent valve 28 relative to central portion 36 once vent valve 28 is mounted thereon.

As shown in FIGS. 17 and 18, vent valve 28 has a top portion generally designated 44 and an upstanding member 48, here a cylindrical wall, that extends upward to and merges with top portion 44. Top portion 44 has a thin flexible radially inwardly extending flap 46 that contacts and covers the at least one hole 31 or the plurality of holes 31 of the vent disc employed. (See FIGS. 20, 20A). Preferably, top portion 44 of vent valve 28 has a peripheral radially inwardly extending outer rim 52 that in turn has an upper surface 54, a lower surface 56, and a radially inward depending wall 58 joining upper surface 54 and lower surface 56. Although flap 46 can extend radially inward from any portion of top portion 44 or any portion of inner depending wall 58, preferably flap 46 extends radially inward from depending wall 58, desirably from a lower portion thereof.

FIG. 19, an enlarged view of the encircled portion of flap 46 shown in FIG. 18, clearly shows that flap 46 preferably extends radially inward from the bottom portion of depending wall 58. FIG. 19 also shows that flap 46 preferably curves or arcs downwardly as it extends radially inwardly from depending wall 58. This provides a desirable downward bias to flap 46. As shown in FIGS. 20 and 20A, for this embodiment of flap 46, preferably the undersurface of the flap at least at or adjacent radially inner edge 47 of flap 46 will contact or rest upon the top surface of vent disc 30 of central portion 36 of bottom cap 22, and cover the at least one vent hole 31 or plurality of vent holes 31 of vent disc 30. Preferably also lower surface 56 of outer rim 52 typically will tightly contact or rest upon the top surface of vent disc 30 of central portion 36 of bottom cap 22. It has been found that curved flaps, as shown, improve sealing of the flap to the vent disc surface, as compared with normally or initially flat flaps. The curvature of the flap diminishes with the increased over pressure of the liquid. With reduced over pressure, the thinned radially inner edge 47 of flap 46, especially with lower durometers, sticks better to the vent disc to prevent minor liquid seepage or leakage under the flap.

FIG. 19A is an enlarged vertical sectional view, with portions excluded, as would be seen along line 19A-19A of vent valve assembly 10 shown in FIG. 1. FIG. 19A shows vent valve assembly 10, comprised of bottom cap 22 and vent valve 28 mounted on raised central portion 36 and on peripheral portion 38 of bottom cap 22. More particularly, vent valve 28 has peripheral portion 32 seated in seat 42 and resting on ridge 33, for sealing vent assembly 10 with container 14 when the two are attached or connected together (FIG. 20). Peripheral portion 32 merges into upstanding member 48 which merges into top portion 44 and is generally parallel to and has an abutment portion 88 that abuts against an upper portion of internal wall 37 of bottom cap central portion 36. Vent valve 28 has top rim 52 that has an inner depending annular wall 58 from the lower portion of which annular, curved flap 46 with radially inner edge 47 extends. Flap 46 covers vent holes 31 in accordance with the invention.

FIG. 20 is a schematic of a vertical sectional view taken through a liquid dispensing baby bottle 14 whose bottom open end 12 is sealingly attached or connected to a preferred vent valve assembly 10 of FIGS. 1 and 19. Bottom open end 12 typically has a cylindrical neck 16, a downwardly directed sealing surface 18, and structure, for example, an external thread 20, for attaching or connecting bottom cap 22 to bottle 14.

Although not shown in FIGS. 17-19, but shown in other FIGS., flap 46 preferably has an annular configuration. Radially inner edge 47 of flap 46 defines a central opening CO through which venting air that passes through vent holes 31 enters the interior of the container or bottle to relieve the vacuum created during feeding. Flexible flap 46 can comprise or be made of silicone, elastomer, thermoplastic urethane, or natural or synthetic rubber. It is not required, but it is preferable that the entirety of vent valve 28 be made of the same material. Preferably, flexible flap 46 and preferably the entirety of vent valve 28 is made of silicone, or elastomer.

Flap 46 of the present disclosure is made of a thin flexible material. By "thin", it is meant that the thickness of the flap can be within a broad range of from about 0.005 inch to about 0.060 inch, more preferably from about 0.005 inch to about 0.030 inch and most preferably from about 0.007 inch to about 0.017 inch, depending, for example, on the material of which the flap is made, the durometer of the material, and the flexibility desired for the particular application. It is contemplated that the activation pressure to flex or move the flap and open the vent hole(s) can be varied as desired by varying the thickness, durometer and/or type of silicone or other material. It is also contemplated that the liquid flow rate of nipples for baby bottles can be varied as desired by varying one or more of the same factors. With respect to flexibility of the desirable materials mentioned herein, the durometer of the material can be broadly within the range of from about 30 to about 85. Below about 30, the materials may tend be too sticky for the suction pressures, e.g., low, desired for the application, and above 80 the materials may tend be too hard for the suction pressures desired. A more preferred range would be from about 30 to about 70 durometer.

For the preferred flap 46 of the present disclosure, satisfactory results have been obtained with flaps 46 that are about 0.020 inch thick where they join or extend from the bottom portion of depending wall 58 of top rim 52 of vent valve 28, and that taper gradually as they extend radially outward to a thickness of about 0.012 inch at radially inner edge 47. These thicknesses were suitable for annular flaps that are about 0.250 inch wide, of a vent valve made of 50 durometer silicone, for use in a baby bottle having a nipple for dispensing, and that was filled to a capacity of about 5.1 inches of water. These results were obtained using an integral vent disc 30 whose vent holes 31 had the configuration shown in FIG. 10. More particularly, the diameter of the cylindrical upper portion 66 of the vent holes at the upper surface of central portion 36 of vent disc 30 of bottom wall 34, was from about 0.010 inch to about 0.030 inch, and the diameter of the tapered or frustoconical lower portion 64 of the vent holes at the lower surface of the central portion 36 or vent disc 30 of bottom wall 34 was from about 0.030 inch to about 0.060 inch. Under the above conditions, it was found that very little or next to no suction pressure was needed to achieve an objective of the present disclosure. It is contemplated that, for example, the thickness and/or the durometer of the baffle or flap, can be varied to vary the venting rate and/or venting ease.

With respect to FIGS. 21 through 52, features and elements having 3 digit 100 to 199 series of reference numbers (without a prime symbol) that incorporate the 2 digit reference numbers previously used in connection with FIGS. 1 through 20, unless otherwise indicated, are basically the same as and operate basically the same as the features and elements having the 2 digit numbers 10 through 99 used in connection with FIGS. 1 through 20, for example, "vent valve 28" and "vent valve 128". Features and elements having the 100 to 199 series of reference numbers additionally indicated with a prime symbol denotes that the feature or element is different or operates differently in some respect that will be described.

Figure 21:
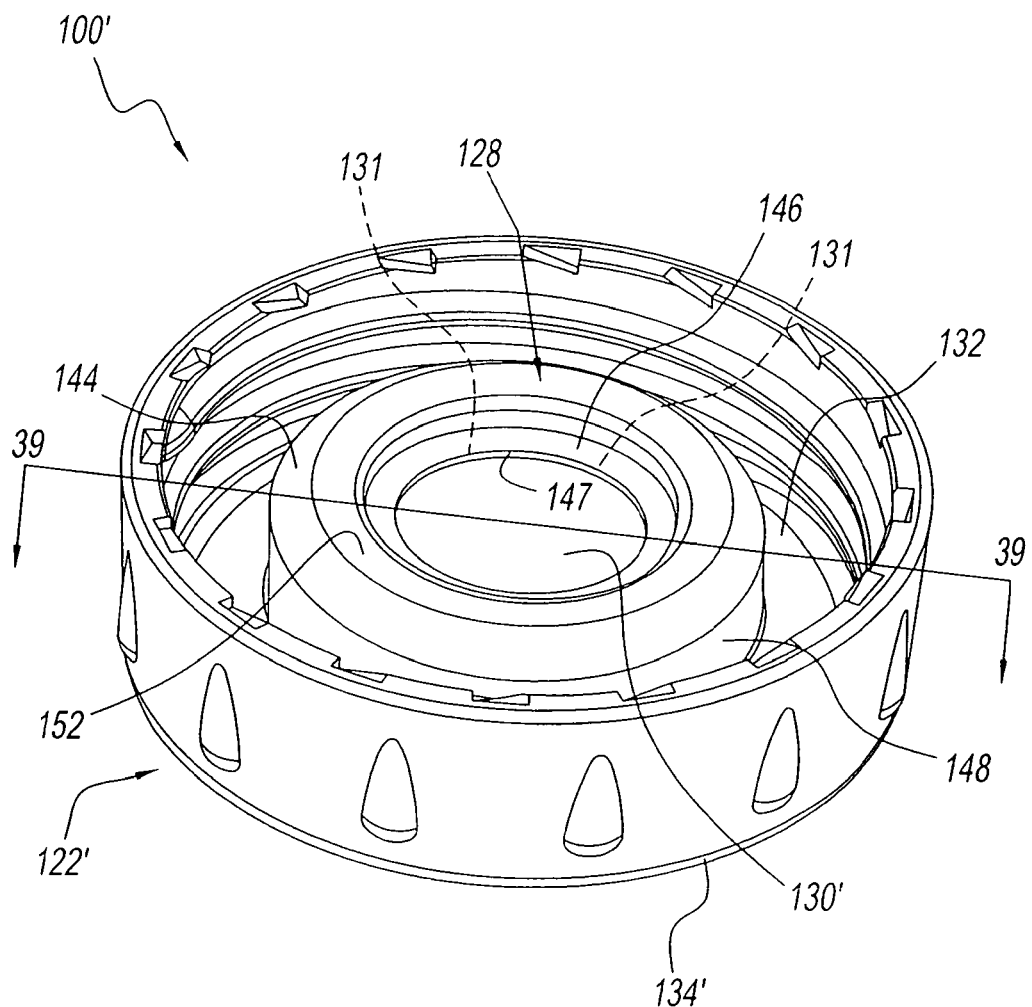
FIG. 21 is a top perspective view of a second embodiment of the vent valve assembly of the present invention.

Referring now to FIG. 21, there is shown a top perspective view of a second vent valve assembly 100 of the present disclosure, for attachment or connection to the bottom open end 12 of a liquid dispensing container, for example, baby bottle 14 in the manner that vent valve assembly 10 was attached or connected, as shown in FIG. 20. Vent valve assembly 100 as shown in FIG. 21 is similar to vent assembly 10 shown in FIG. 1, except that vent valve 128 does not have grasping tabs 62, and bottom cap 122' and its bottom wall 134' are different in one important respect, that vent disc 130' is not integral with bottom wall 134', but rather is a separate piece or element that is removably mounted to vent valve 128 in a manner to be explained.

Figure 22:
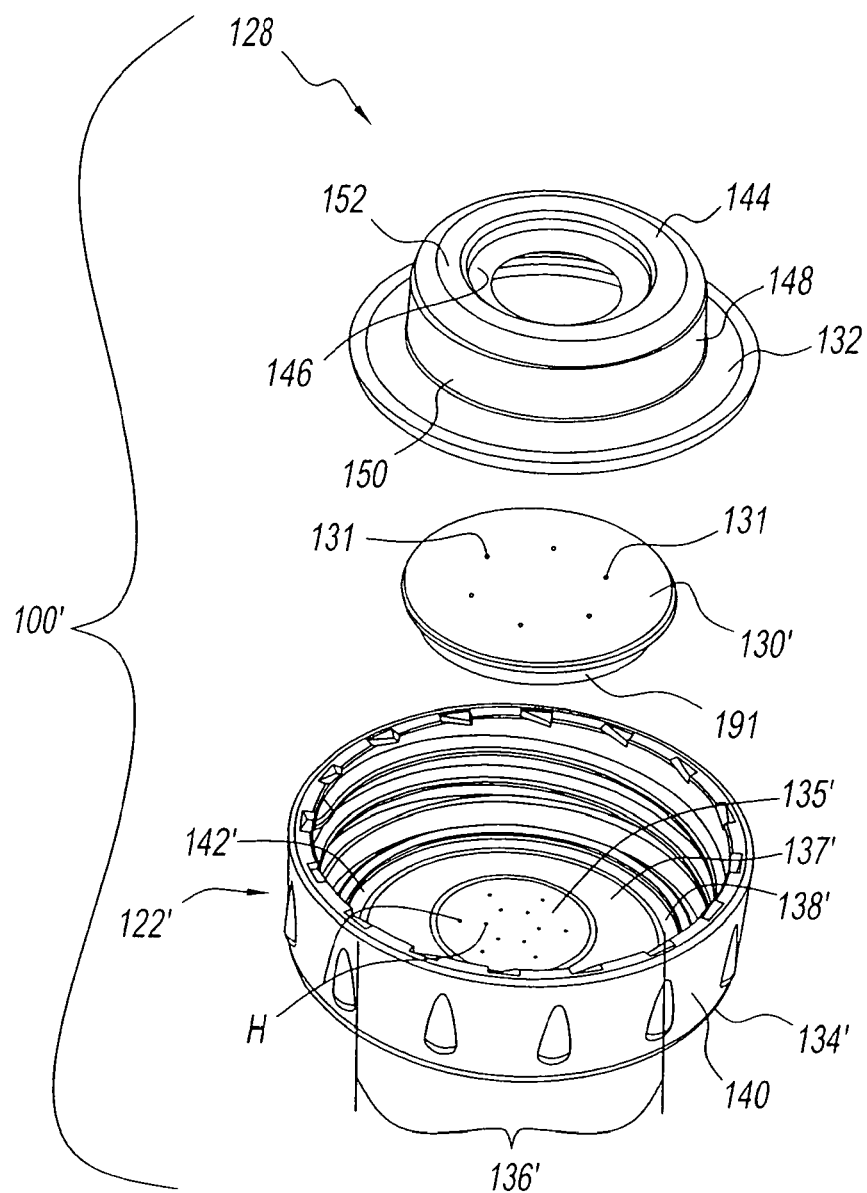
FIG. 22 is a top perspective exploded view of the vent valve assembly shown in FIG. 21.
Figure 23:
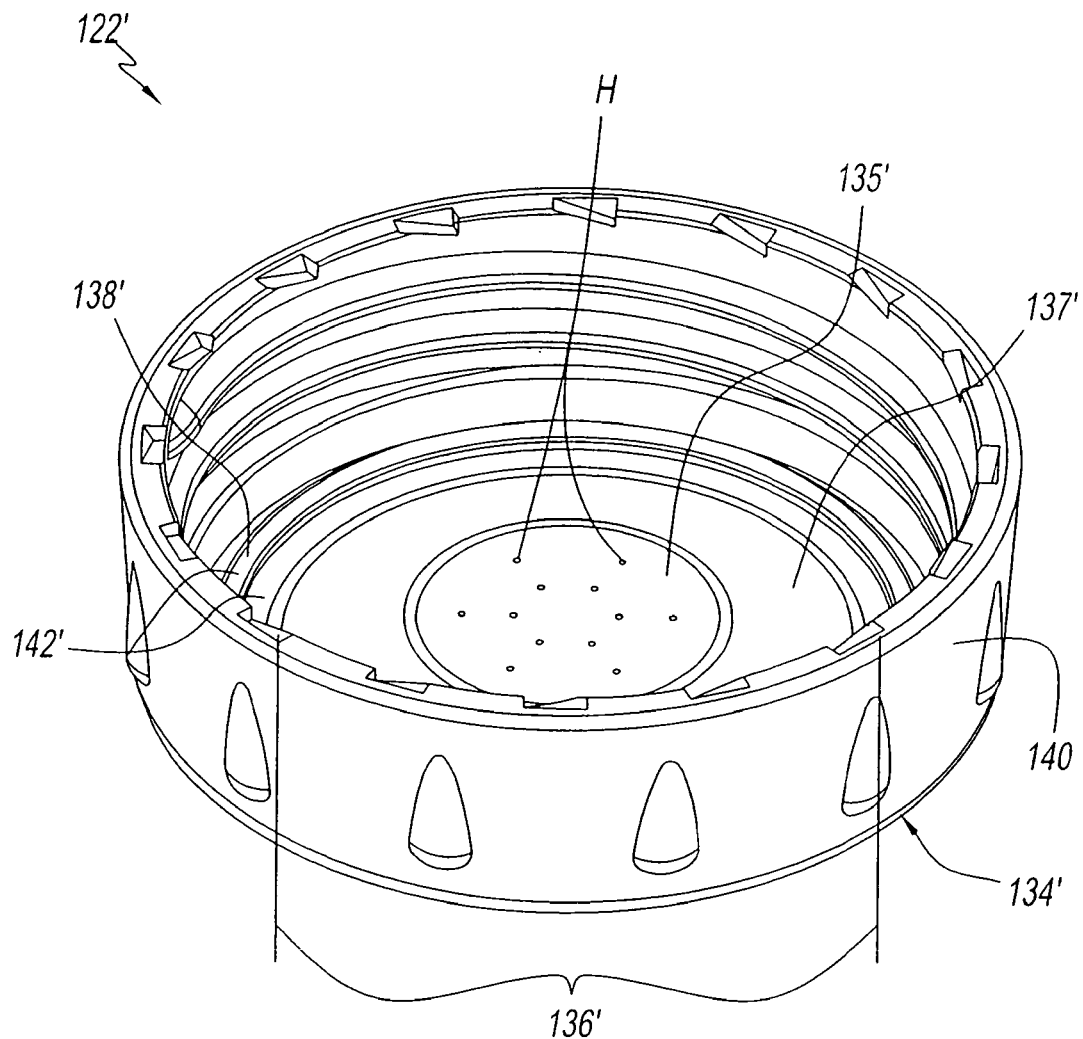
FIG. 23 is a top perspective view of the bottom cap of the vent valve assembly shown in FIG. 21.
Figure 24:
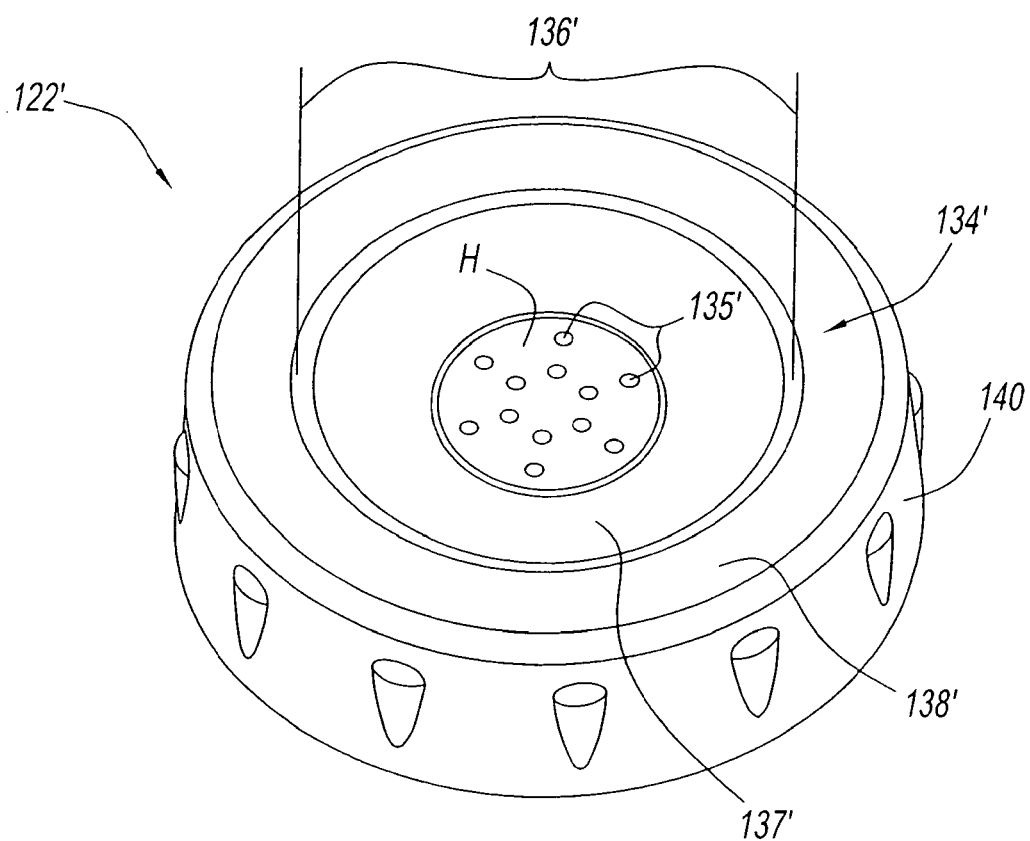
FIG. 24 is a bottom perspective view of the bottom cap shown in FIG. 23.

FIG. 22 is an exploded top perspective view of the vent valve assembly 100' of FIG. 21. As shown in FIGS. 21 through 24, (FIG. 23 being a top perspective view of bottom cap 122', and FIG. 24 being a bottom perspective of bottom cap 122'), vent valve assembly 100' is comprised of bottom cap 122', vent valve 128 and a separate vent disc 130'. As will be explained, vent valve assembly 100' is a double vented system. Bottom cap 122' is comprised of a bottom wall 134' having a central portion 136', a peripheral portion 138' that surrounds central portion 136', and a side wall 140. Central portion 136' of bottom wall 134' need not be, but preferably is raised relative to peripheral portion 138' of bottom wall 134'. Central portion 136' includes an upwardly directed inner wall 137', here exemplarily shown as arcuate and frustoconical, that extends from the radially inner portion of peripheral portion 138' upwardly to and merges with the radially outer portion of central panel 135'. Central panel 135' has at least one small hole H, preferably a plurality, shown in FIG. 22 as twelve small holes H therethrough. Central panel 135' need not be, but as shown in this embodiment, it preferably is, integral or one-piece with, preferably raised, central portion 136' of bottom wall 134' of bottom cap 122'. Upwardly directed inner wall 137' can be of any suitable shape or height, for example, domed, angled, stepped, sloped or a combination thereof.

Peripheral portion 138' has an interior surface that forms a seat 142' for receiving a sealing member 132. Sealing member 132 can be a conventional sealing structure (not shown), made, for example, of rubber, elastomeric, silicone or other suitable sealing ring material(s). Preferably, sealing member 132 is peripheral sealing flange 132 or some other part of vent valve 128.

Figure 25:
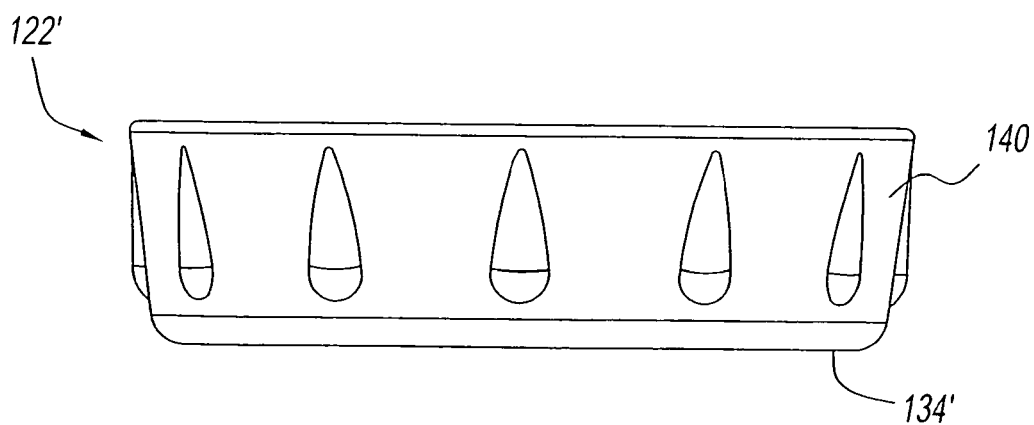
FIG. 25 is a side elevation of the bottom cap of FIG. 22.
Figure 26:
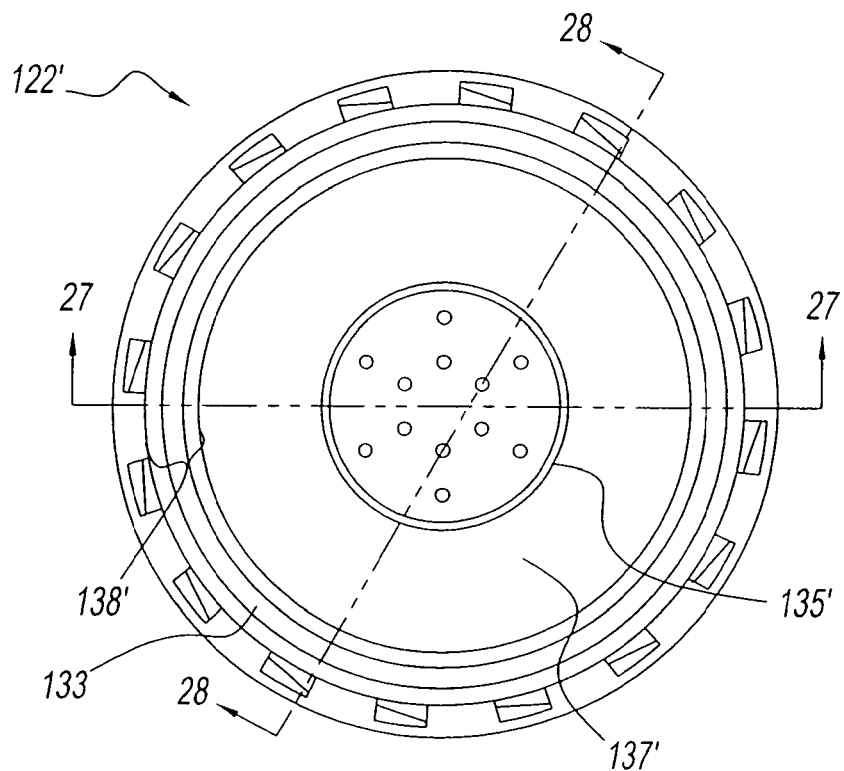
FIG. 26 is a top plan view of the bottom cap of FIG. 25.
Figure 27:
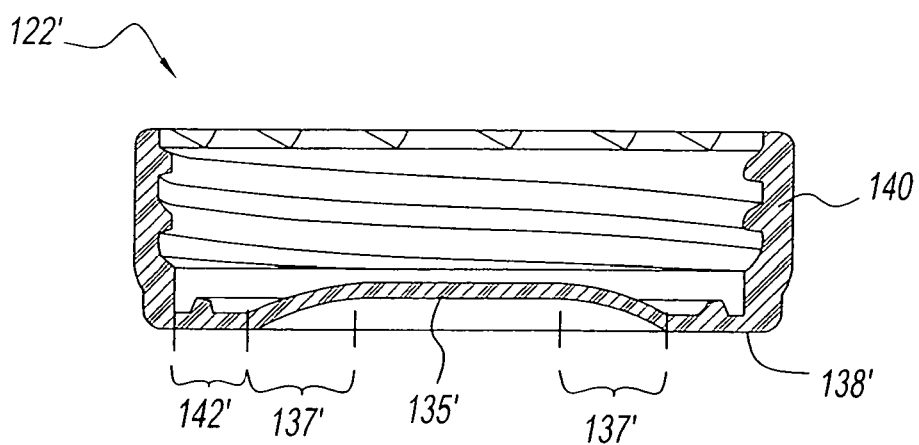
FIG. 27 is a vertical sectional view as would be seen along line 27-27 of FIG. 26.
Figure 28:
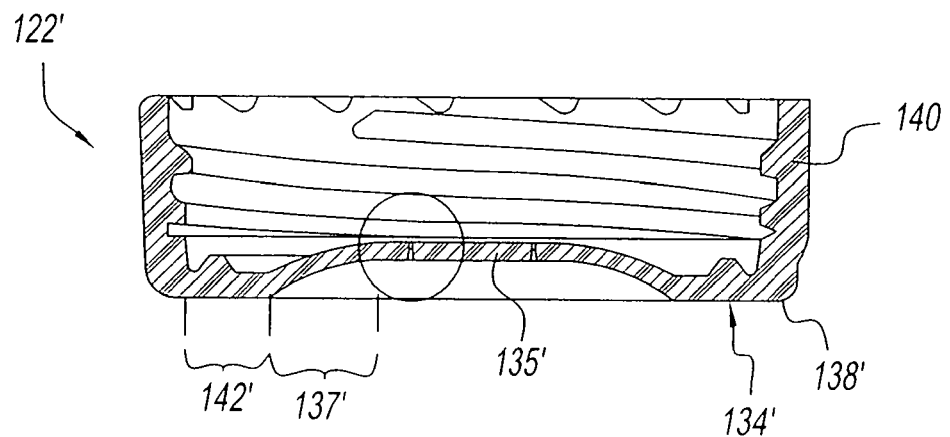
FIG. 28 is a vertical sectional view as would be seen along line 28-28 of FIG. 26.
Figure 29:
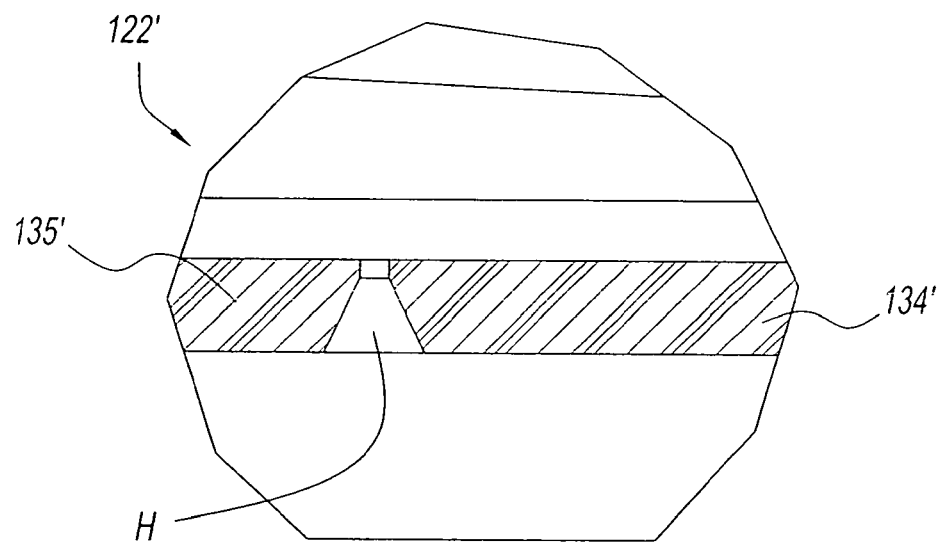
FIG. 29 is an enlarged view of a vertical section taken through the encircled vent hole in the bottom cap shown in FIG. 28.
Figure 30:
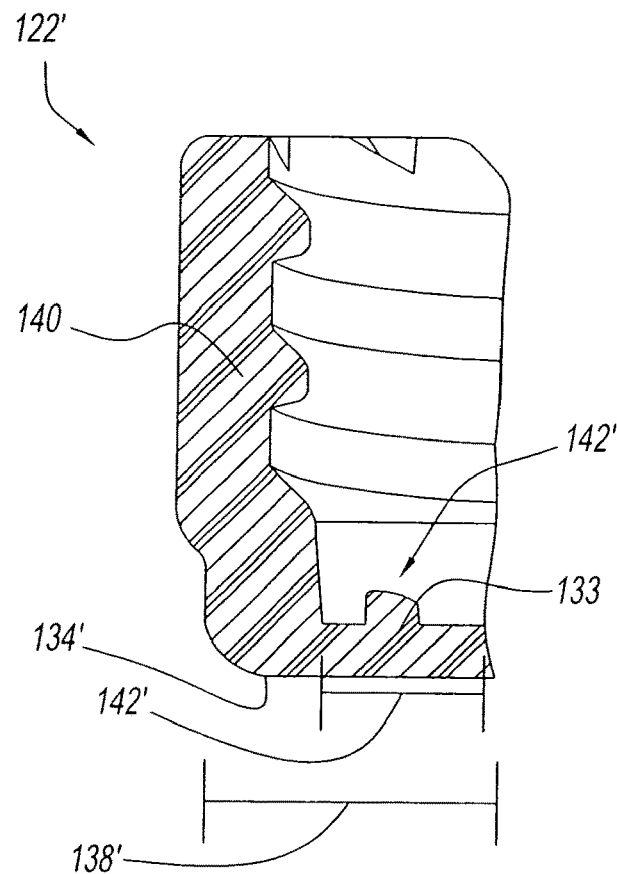
FIG. 30 is an enlarged view of a vertical section taken through the left portion of the bottom cap of FIG. 27.
Figure 31:
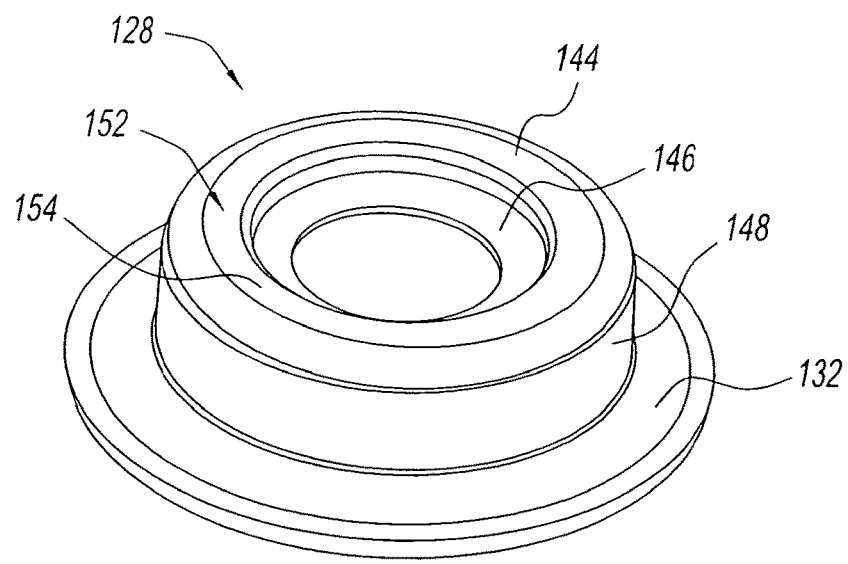
FIG. 31 is a top perspective view of the vent valve shown in FIG. 21.
Figure 32:
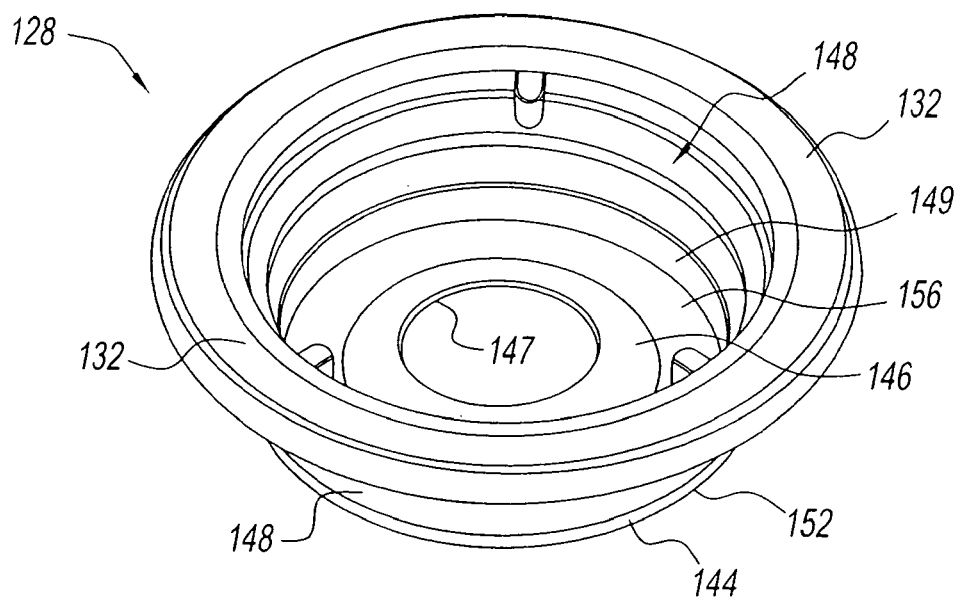
FIG. 32 is a bottom perspective view of the vent valve shown in FIG. 21.
Figure 33:
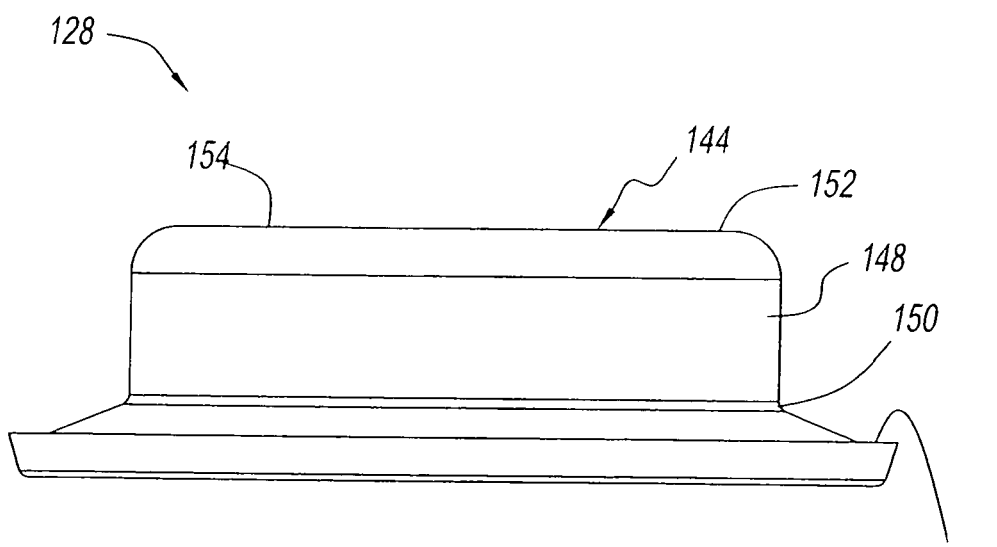
FIG. 33 is a side elevation of the vent valve shown in FIG. 31.
Figure 34:
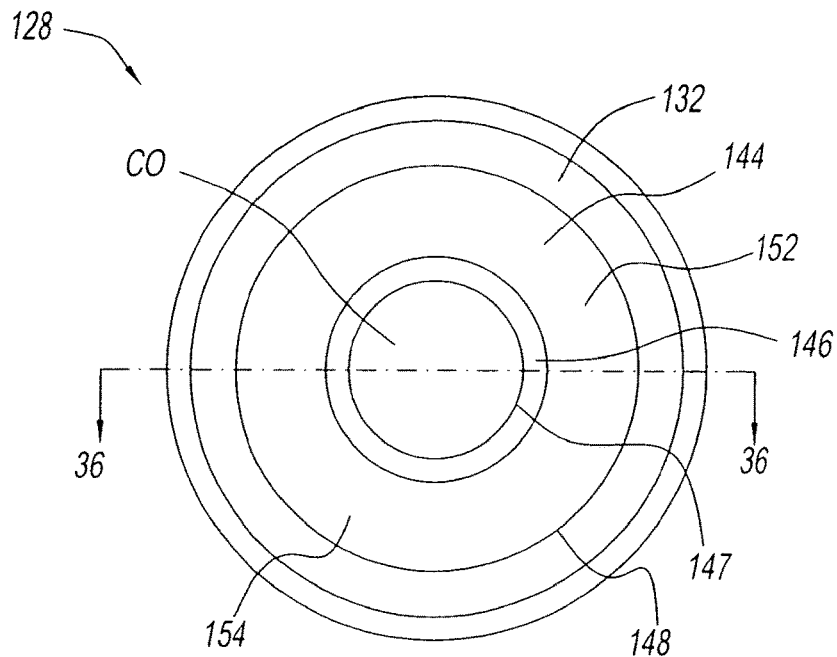
FIG. 34 is a top plan view of the vent valve shown in FIG. 33.
Figure 35:
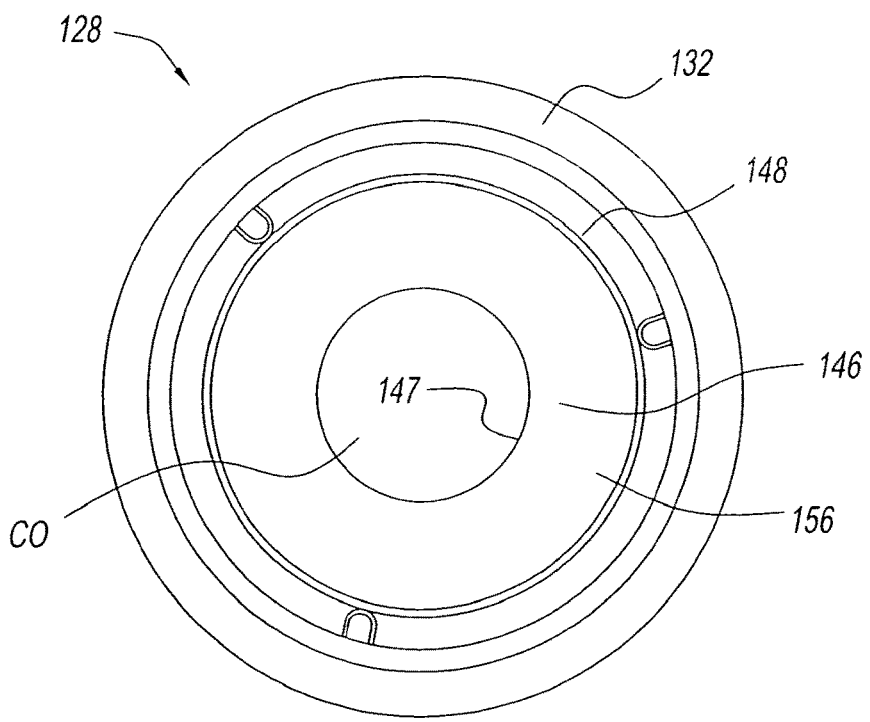
FIG. 35 is a bottom plan view of the vent valve shown in FIG. 33.
Figure 36:
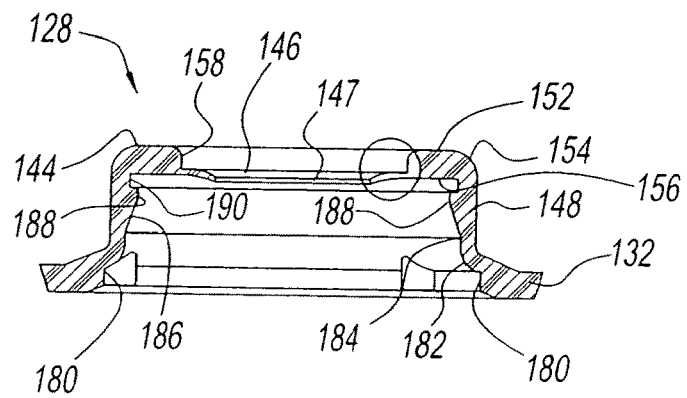
FIG. 36 is a vertical sectional view as would be seen alone line 36-36 of FIG. 34.
Figure 37:
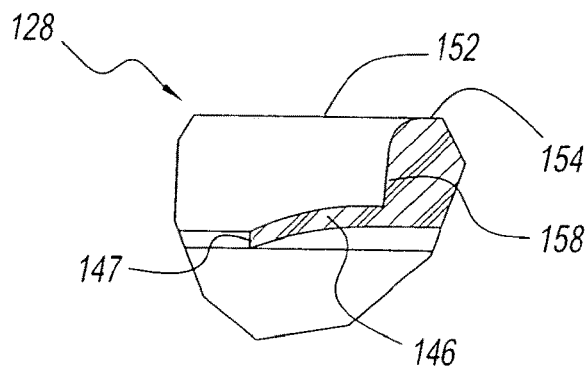
FIG. 37 is an enlarged view of the encircled portion of the flap shown in FIG. 36.

Referring now to FIGS. 25 through 30 further in connection with bottom cap 122', FIG. 25 is a side elevation of the bottom cap, FIG. 26 is a top plan view, FIGS. 27 and 28 are vertical sectional views taken through FIG. 26, FIG. 29 is an enlargement of an encircled portion of FIG. 28 through a vent hole H, and FIG. 30 is an enlargement of a portion of FIG. 28. More particularly, these Figures show peripheral portion 138', upwardly directed inner arcuate or frustoconical wall 137' and basically flat raised central panel 135' of bottom wall 134'. FIG. 29 shows an embodiment of holes H in central panel 135', wherein preferably small holes H are a combination of a cylindrical portion at the top surface and a frustoconical portion at the lower surface of bottom wall 134'. The same design of small holes may be used for the vent holes 131' of vent disc 130'.

Vent valve 128 of the second embodiment of the present disclosure is basically the same as, and operates basically the same as vent valve 28 described earlier in connection with the first preferred embodiment of the invention. Thus, vent valve 128 shown in and described in connection with FIGS. 21, 22, 31 through 40 and 46 is basically the same and operates basically the same as vent valve 28 shown in and described in connection with FIGS. 2,12,13 through 19, 19A and 20. One minor difference between vent valve 128 and vent valve 28, is that vent valve 128 is presented without grasping tabs 62. Another difference is in the manner in which vent valve 128 relates to and cooperates with vent disc 130'. Whereas top portion 44 of vent valve 28 sits on a vent disc 30 that preferably is an integral portion of or is mounted on raised central portion 36 of bottom wall 34, in the second preferred embodiment of vent valve assembly 100', vent disc 130' is an individual or separate member that is mounted to upstanding member or wall 148. More particularly, referring to FIG. 36, the inside surface of upstanding member 148, here shown as a cylindrical wall, of vent valve 128 has a radially outwardly extending annular groove 190 formed therein for removably mounting a vent disc, e.g., 130' (not shown) therein. Groove 190 need not be but preferably is annular and located at the junction of the inside surface of upstanding wall 148 and lower surface 156 of top rim 152. Groove 190 need not be but preferably is unbroken or continuous. The inside surface of upstanding member 181, starting at its lowest extent, has a first undercut 180, a first transition portion 182, a second undercut 84, a second radially inwardly extending angled transition portion 186, and a radially inwardly extending abutment surface 188. The lower surface of groove 190 terminates at a radially inward edge of depending inside surface abutment portion 188 of upstanding wall 148.

Figure 38:
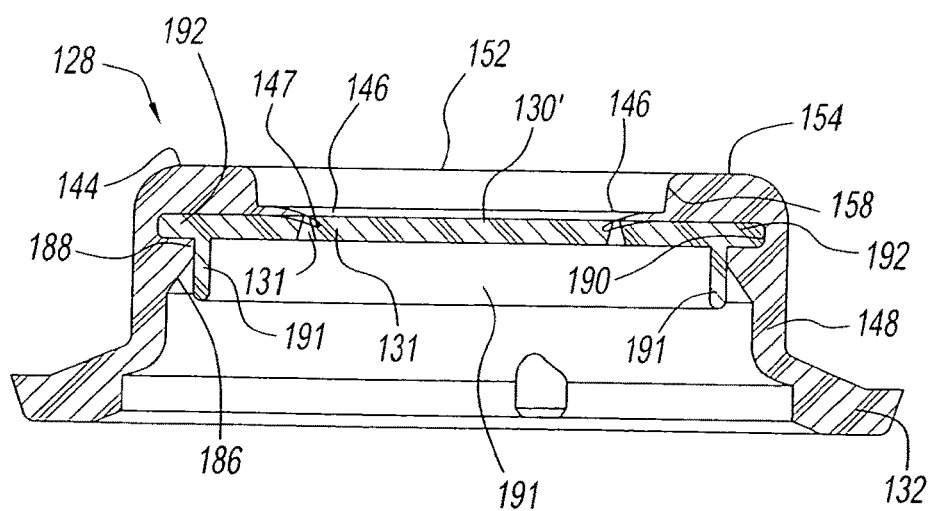
FIG. 38 is an enlarged view of a vertical section through a valve assembly of the second embodiment of the present invention.

FIG. 38 is an enlarged vertical sectional view through a portion of a vent valve assembly of the second embodiment 100' of the present disclosure. More particularly, FIG. 38 shows a circular vent disc 130' removably press fit mounted tightly into annular groove 190 of vent valve 128. Vent disc 130' has a peripheral outer edge or rim 192, and the lower surface of vent disc 130' includes at least one depending member that is radially inwardly offset from the peripheral outer edge or rim 192, so that the at least one depending member abuts the inside surface of the upstanding wall 148 of vent valve 128. The at least one member preferably is or includes an annular depending skirt 191 that abuts abutment surface 188 to stabilize and help secure vent disc 130' in place in vent valve 128. FIG. 38 also shows annular flap 146 covering vent holes 131'. Although flap 146 is shown extending through the thickness of vent disc 130', flap 146 covers vent holes 131', this showing is done merely to show that flap 146 in its normal condition is curved downward and biased against the top surface of vent disc 130'. FIG. 38 shows that in this embodiment of vent disc, vent holes 131' are tapered or frustoconical. Vent disc 130' is shown as a separate piece and having a plurality of six small vent holes 131 arranged in a circular or annular pattern extending about, and preferably within a peripheral portion of vent disc 130'.

Figure 39:
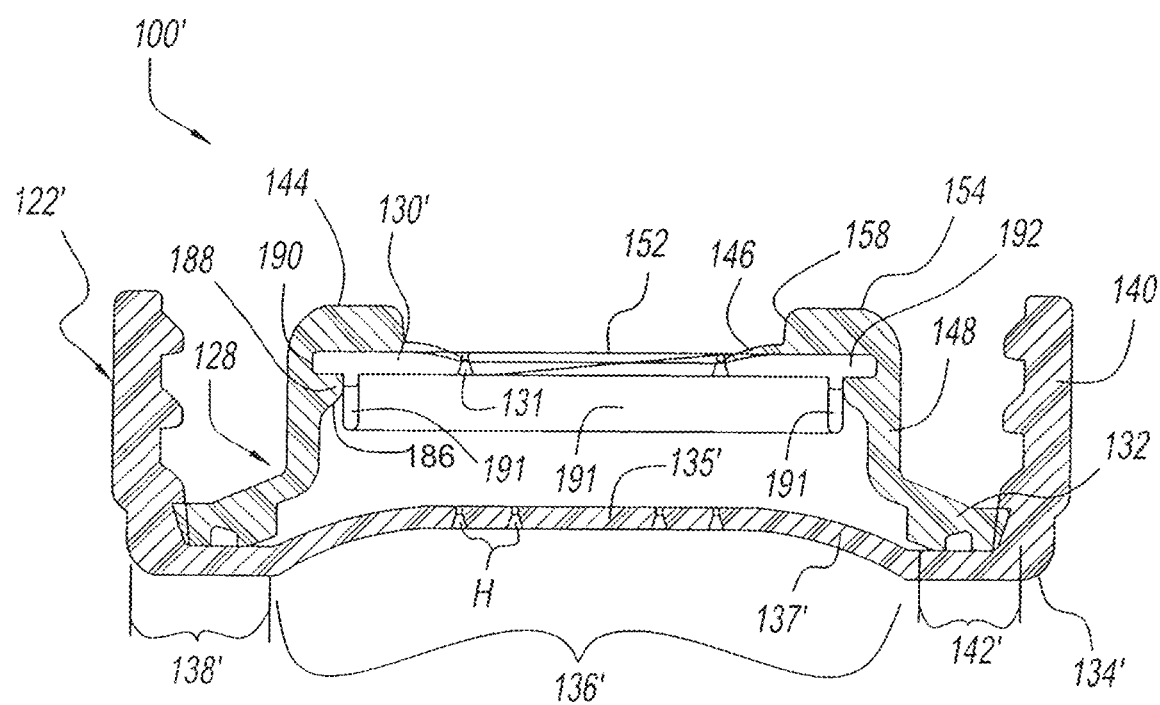
FIG. 39 is a vertical sectional view as would be seen along line 39-39 of the vent valve assembly of FIG. 21.

FIG. 39 is a vertical sectional view through a portion of the second embodiment of the vent valve assembly 100' of the present disclosure. Vent valve assembly 100' is an example of a double vent system in that there are two layers of small vent holes, those designated 131' in vent disc 130' positioned just below flap 146, and those designated H in underlying bottom wall 134' of bottom cap 122. In the particular example shown, there preferably are six small vent holes 131' invent disc 130', and twelve small vent holes H in bottom wall 134'. Although the second layer of holes is not necessary, it is desirable because it acts as a safety venting system, to prevent leakage from bottom cap 122' in case some liquid seeps through the top layer of holes or in case some liquid migrates around the top venting disk. The second layer of holes can have one or more holes.

It is contemplated that vent discs need not be mounted to vent valve 128 or 28 by being press fit mounted for removal from or mounting to groove 190 for example by bending and flexing vent valve 128. Alternatively, vent discs of the present disclosure can be mounted to vent valves of the present disclosure by molding, co-molding or bonding them together.

FIGS. 40 through 45 basically show an alternative, modified vent disc 130" and show it mounted in a vent valve of the disclosure. More particularly, FIG. 40 shows a bottom perspective view of vent valve 128 having press fit mounted in the groove thereof (not shown) vent disc 130" modified in that it has an elongated grasping strut 196 integrally formed on and depending the bottom surface of disc 130". As shown, preferably the opposite ends of strut 196 join depending skirt 191. Aside from facilitating grasping of disc 130", strut 196 helps to rigidify the disc.

FIG. 41 and FIG. 42 show that vent disc 130" is circular and has a rounded or chamfered annular peripheral rim 192 that is suited to fit tightly in groove 190 of vent valve 128.

FIG. 43 is an enlarged view of the encircled the combination frustoconical (lower) and vent cylindrical (upper) vent hole 131 shown in FIG. 42.

Figure 44:
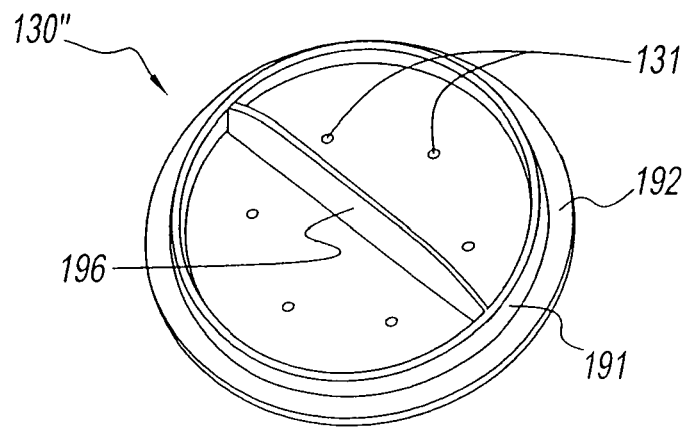
FIG. 44 is a bottom perspective view of the vent disc shown in FIG. 41.

FIG. 44, a bottom perspective view of vent disc 130", shows that elongated strut 192 preferably is integrally molded at its opposite ends to depending skirt 191.

Figure 45:
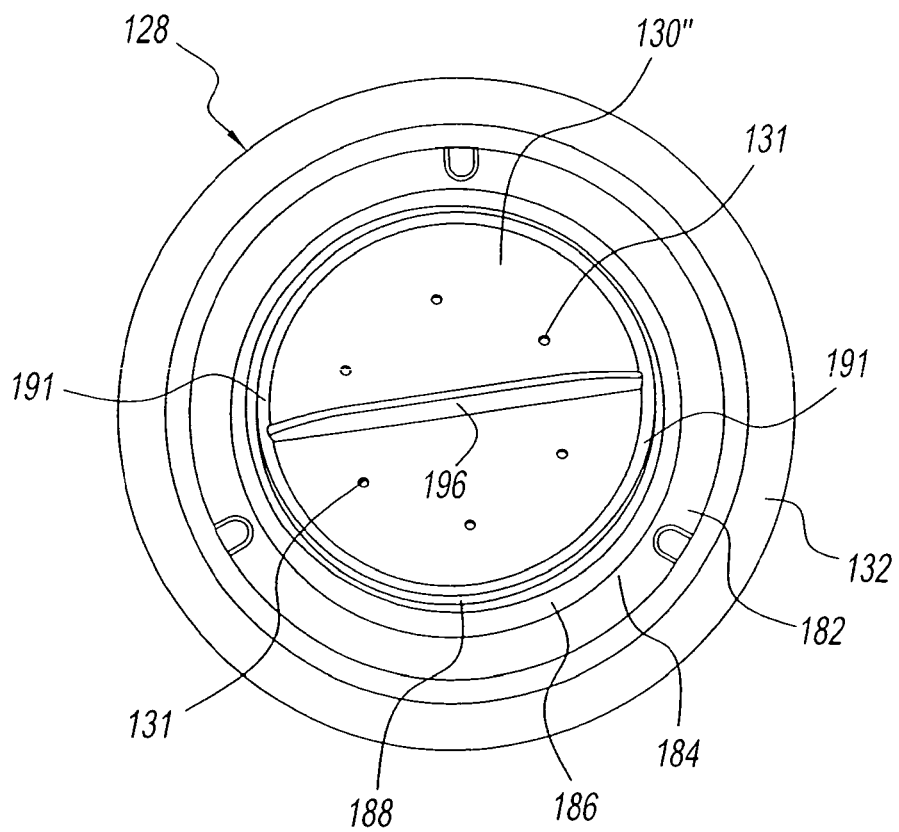
FIG. 45 is a bottom plan view of the vent valve assembly of FIG. 40.

FIG. 45 is a bottom plan view of vent disc 130" press fit mounted to vent valve 128.

Figure 46:
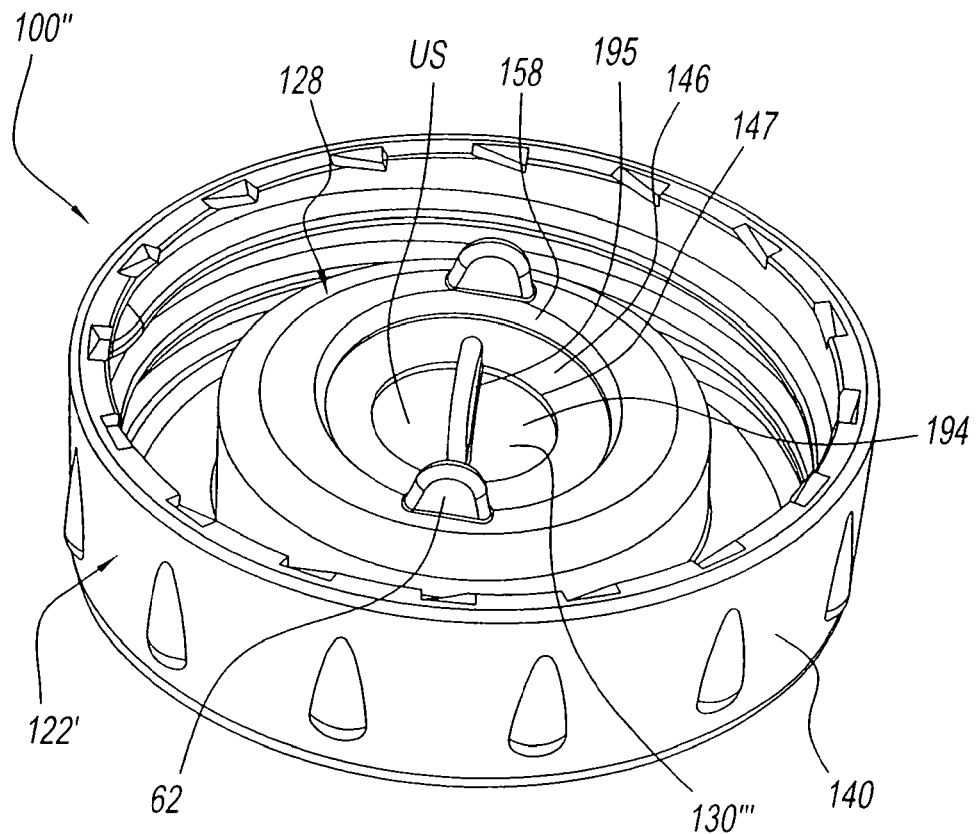
FIG. 46 is a top perspective view of a third embodiment of a vent valve assembly of the present invention, with a modified vent disc.
Figure 47:
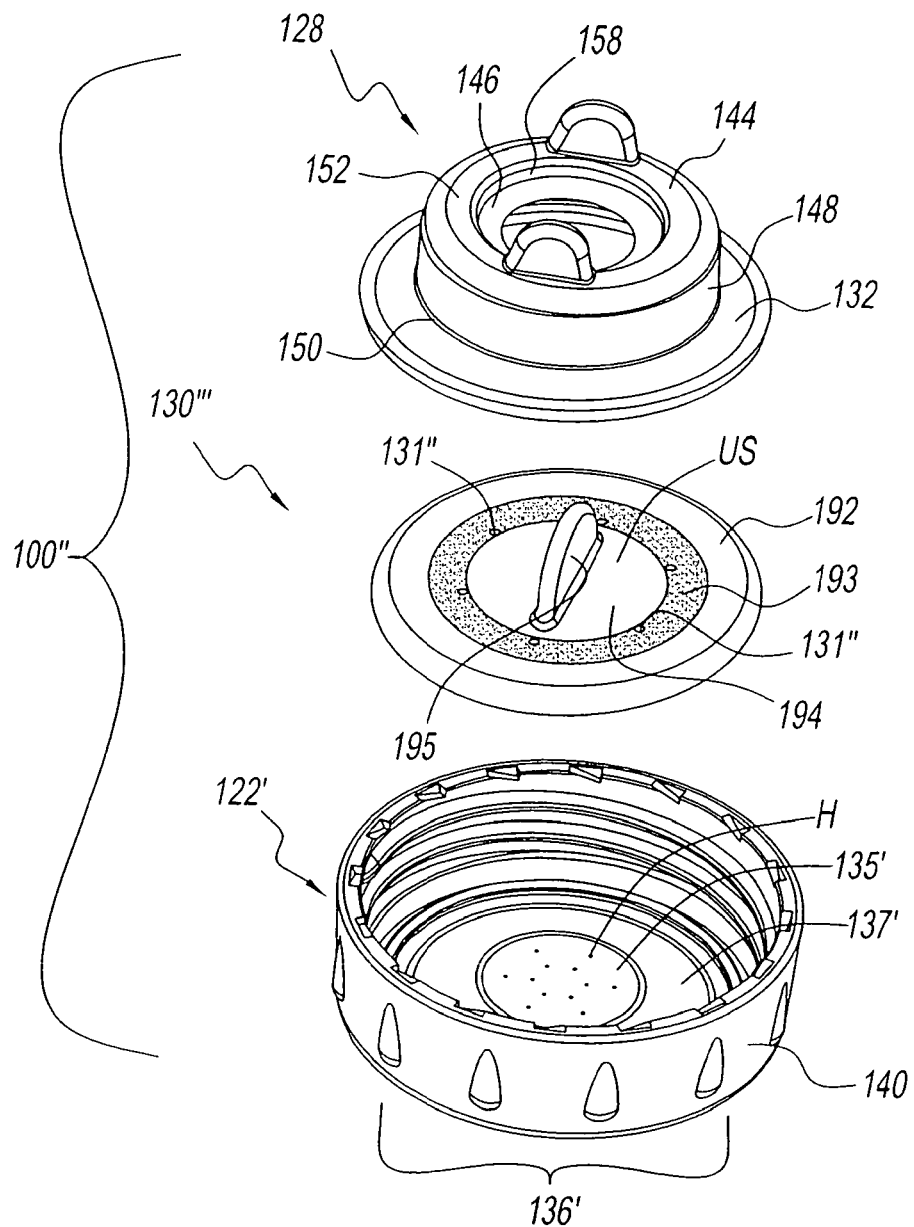
FIG. 47 is a top perspective exploded view of the vent valve assembly of FIG. 46.

FIGS. 46 through 51 show a third embodiment of a vent valve assembly 100" of the present disclosure, the vent valve assembly having a further modified vent disc. FIG. 46 shows vent valve assembly 100" is comprised of bottom cap 122', vent valve 128, and vent disc 130". Vent disc 130" is reversible. Each of its upper and lower surfaces is a mirror image of the other. More particularly, as shown in FIGS. 46, 47, 49 and 50, which show upper surface US, (and as shown in FIG. 48 which shows lower surface LS) each surface of disc 130" has a first radially annular peripheral outer rim or edge 192 having a rounded edge, for being press fit into groove 190, a next or second radially inward annular peripheral portion or area 193 that is textured, and within which is positioned vent holes 131", and a next radially inward central portion 194, within which is situated a diametrically disposed, semi-circular grasping tab 195. Since vent holes 131" are cylindrical, there will not be any variation in vent flow through vent holes 131" regardless of whether, relative to the upper dispensing end of baby bottle 14, upper surface US of vent disc 130" is facing upward.

Figure 52:
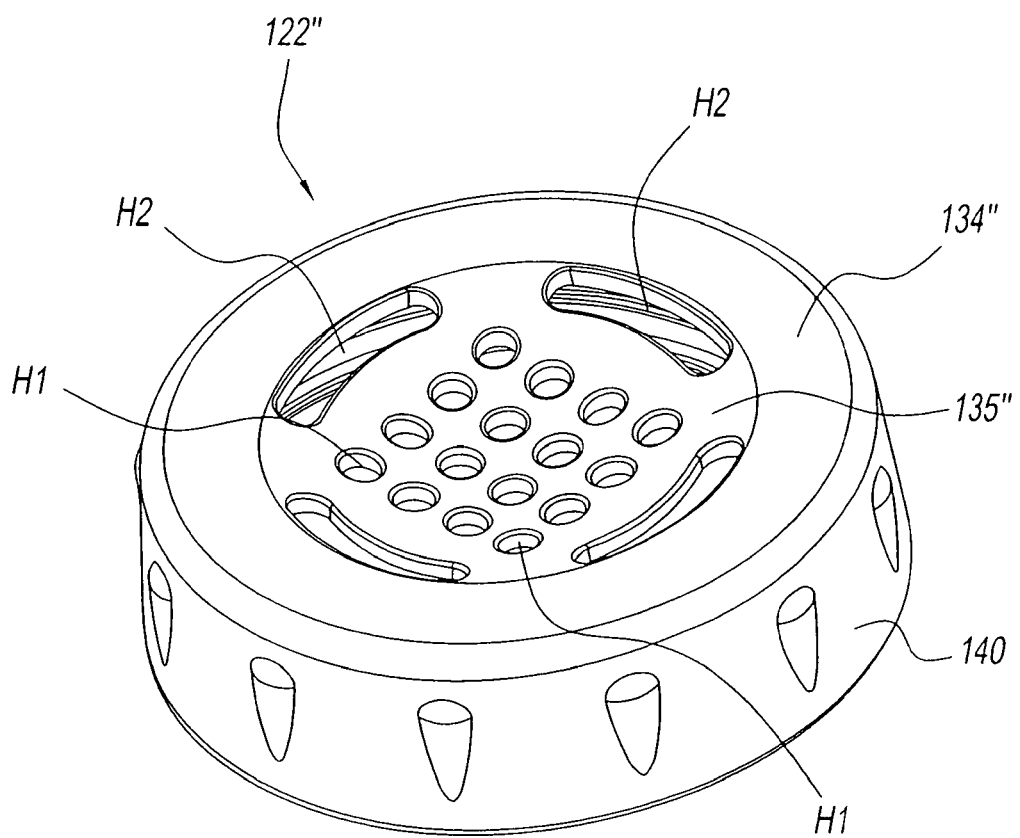
FIG. 52 is a bottom perspective view of a modified bottom cap that can be employed with a second embodiment of the present invention.

FIG. 52 is a bottom perspective view of a modified bottom cap 122" that can be employed in embodiments of contemplated vent valve assemblies of the present disclosure that employ a double venting system. Thus, it can be seen that vent holes H, designated H1 and H2, in bottom cap 122" can be moderate and/or large, H1 being moderate-to-large and cylindrical, and vent holes H2 being large and oblong. FIG. 52 also shows that holes H can be of any desired shape, and that variously shaped holes can be combined in the same bottom wall 134". FIG. 52 further shows that the shape of central portion 135" can be any suitable shape, including domed. Bottom cap 122" is especially suitable for being employed with embodiments of vent valve assemblies of the invention utilizing a vent valve 28, 128 with a separate vent disc that is mounted to the vent valve.

Vented parts of the vent valve assemblies of the present disclosure can be made of any suitable rigid material or materials, for example, a thermoplastic, polypropylene, polyethylene, acrylonitrile butadiene styrene or polycarbonate.

By "rigid" herein is meant that the part is substantially rigid, that is, it does not have to be absolutely rigid. The part is rigid enough to perform as intended. For example, while a vent disc may exhibit some flexing under great stress, the disc will not flex under contemplated stresses to, for example, be partly or fully dislodged during use or cleaning from its mounting groove, or be distorted enough to affect the vent hole size and change its designed vent flow characteristics.

The present disclosure having thus been described with particular reference to embodiments thereof, it will be obvious that various changes may be made therein without departing from the spirit of the present disclosure as described herein.

What is claimed is:

1. A liquid dispensing container, comprising:
   a nipple;
   a bottle having a rigid wall partially defining a volume for a liquid, the wall in contact with the liquid having an open top end and an open bottom end, the nipple attached to the open top end and partially defining the volume;
   a bottom cap configured to attach to the open bottom end and partially defining the volume, comprising:
   a bottom wall;
   a side wall extending radial outward of and about the bottom wall, the side wall defining a structure configured to be engaged to the open bottom end of the liquid dispensing container;
   an inner wall extending radially inwardly and upwardly from the bottom wall; and
   a vent disc extending from the inner wall, the vent disc comprising a plurality of holes proximal to the inner wall; and
   an annular flexible flap covering the plurality of holes in the vent disc of the bottom cap, the flexible flap deformable from a first configuration to a second configuration, wherein in the first configuration the flexible flap contacts the vent disc and the bottom wall and closes the plurality of holes, and in the second configuration, an activation pressure is applied to the nipple and within the volume and the flexible flap is distant from the plurality of holes for a vent air to flow into the volume and alleviate a vacuum created in the volume during feeding or dispensing when the liquid dispensing container is in a tipped feeding or dispensing position.

2. The liquid dispensing container of claim 1, wherein the bottom wall has a central portion and a peripheral portion surrounding the central portion, the side wall extends upwardly from the peripheral portion, the central portion defines the vent disc and has the inner wall that is raised and extends from the peripheral portion to the vent disc.

3. The liquid dispensing container of claim 2, wherein the vent disc has a top surface, the top surface has a portion having a texture roughened relative to a remainder of the top surface.

4. The liquid dispensing container of claim 2, wherein the vent disc is circular.

5. The liquid dispensing container of claim 1, wherein the plurality of holes have a diameter of between 0.005 inch to 0.125 inch.

6. The liquid dispensing container of claim 1, wherein the plurality of holes have a tapered or frustoconical shape.

7. The liquid dispensing container of claim 1, wherein the structure is at least one thread.

8. The liquid dispensing container according to claim 1, wherein the rigid wall has an upper portion adjacent to a lower portion, wherein the upper portion is angled with respect to the lower portion.

9. The liquid dispensing container according to claim 1, wherein the rigid wall is at least partially cylindrical.

10. The liquid dispensing container according to claim 2, wherein the side wall further comprises an upper wall that is sloped.

11. The liquid dispensing container according to claim 2, wherein the side wall further comprises an upper wall that is stepped.

12. The liquid dispensing container according to claim 1, wherein the flexible flap has a durometer of between about 30 and about 85.

13. A liquid dispensing container, comprising:
a nipple;
a bottle having a rigid wall partially defining a volume for holding a liquid, the wall in contact with the liquid and having an open top end and an open bottom end, the nipple attached to the open top end and partially defining the volume;
a bottom cap configured to attach to the open bottom end and partially defining the volume, comprising:
a bottom wall;
a side wall extending radial outward of and about the bottom wall, the side wall defining a structure configured to be engaged to the open bottom end of the liquid dispensing container;
an inner wall extending radially inwardly and upwardly from the bottom wall; and
a vent disc extending from the inner wall, the vent disc comprising a plurality of holes proximal to the inner wall; and
an annular flexible flap covering the plurality of holes in the vent disc of the bottom cap, the flexible flap deformable from a first configuration to a second configuration,
wherein in the first configuration, the flexible flap contacts the vent disc and the bottom wall and closes the plurality of holes, and
wherein in the second configuration, the bottle is in the tipped feeding or dispensing position such that when an activation pressure is applied to the nipple and within the volume, the flexible flap flexes away from the plurality of holes such that an air flows into the volume through the plurality of holes.

14. The liquid dispensing container of claim 13, wherein the bottom wall has a central portion and a peripheral portion surrounding the central portion, the side wall extends upwardly from the peripheral portion, the central portion defines the vent disc and has the inner wall that is raised and extends from the peripheral portion to the vent disc.

15. The liquid dispensing container of claim 13, wherein the air flows in through the plurality of holes to alleviate a negative pressure within the volume.

16. The liquid dispensing container of claim 13, wherein in the tipped feeding or dispensing position, the liquid flows towards the nipple while the air flows towards the plurality of holes.

17. A liquid dispensing container, comprising:
a nipple;
a bottle having a rigid wall partially defining a volume for holding a liquid, the wall in contact with the liquid and having an open top end and an open bottom end, the nipple attached to the open top end and partially defining the volume;
a bottom cap configured to attach to the open bottom end and partially defining the volume, comprising:
a bottom wall;
a side wall extending about the bottom wall, the side wall defining a structure configured to be engaged to the open bottom end of the liquid dispensing container;
an inner wall extending radially inwardly and upwardly from the bottom wall; and
a vent disc extending from the inner wall, the vent disc comprising a plurality of holes proximal to the inner wall; and
an annular flexible flap covering the plurality of holes in the venti disc of the bottom cap, the flexible flap deformable from a first configuration to a second configuration,
wherein in the first configuration, the flexible flap contacts the vent disc and the bottom wall and close the plurality of holes under a pressure exerted by the liquid, and
wherein in the second configuration, when the liquid dispensing container is in the tipped feeding or dispensing position, the flexible flap flexes away from the plurality of holes such that air flows into the volume through the plurality of holes.

18. The liquid dispensing container of claim 17, wherein in the second configuration, an activation pressure is applied to the nipple and within the volume containing the liquid.

19. The liquid dispensing container of claim 17, wherein the air flows in through the plurality of holes to alleviate a negative pressure within the volume.

20. The liquid dispensing container of claim 17, wherein in the tipped feeding or dispensing position, the liquid flows towards the nipple while the air flows towards the plurality of holes.

* * * * *